(12) United States Patent
Nagasaka

(10) Patent No.: US 7,177,741 B2
(45) Date of Patent: Feb. 13, 2007

(54) CAR-MOUNTED DEVICE CONTROL SYSTEM

(75) Inventor: Chikao Nagasaka, Niwa-gun (JP)

(73) Assignee: Kabushiki Kaisha Tokai-Rika-Denki-Seisakusho, Aichi (JP)

( * ) Notice: Subject to any disclaimer, the term of this patent is extended or adjusted under 35 U.S.C. 154(b) by 273 days.

(21) Appl. No.: 10/492,027

(22) PCT Filed: Oct. 29, 2002

(86) PCT No.: PCT/JP02/11198

§ 371 (c)(1),
(2), (4) Date: Apr. 8, 2004

(87) PCT Pub. No.: WO03/037697

PCT Pub. Date: May 8, 2003

(65) Prior Publication Data

US 2004/0195031 A1    Oct. 7, 2004

(30) Foreign Application Priority Data

Oct. 30, 2001    (JP) .............................. 2001-332992

(51) Int. Cl.
*G09G 5/12* (2006.01)
*B62D 1/04* (2006.01)
*G06F 19/00* (2006.01)

(52) U.S. Cl. .............................. 701/36; 701/1; 701/41; 180/271

(58) Field of Classification Search .................. 701/36, 701/1, 41; 180/271

See application file for complete search history.

(56) References Cited

U.S. PATENT DOCUMENTS

| 4,638,131 | A | * | 1/1987 | Kidd et al. | 200/61.55 |
| 5,319,803 | A | * | 6/1994 | Allen | 455/566 |
| 5,949,149 | A | * | 9/1999 | Shitanaka et al. | 307/10.1 |
| 6,225,578 | B1 | * | 5/2001 | Kobayashi et al. | 200/5 R |
| 6,380,536 | B1 | * | 4/2002 | Inoue et al. | 250/231.13 |
| 6,624,365 | B2 | * | 9/2003 | Miyako et al. | 200/61.54 |
| 2003/0023353 | A1 | * | 1/2003 | Badarneh | 701/1 |

FOREIGN PATENT DOCUMENTS

| GB | 694 202 A | | 7/1953 |
| JP | 06-171516 | * | 6/1994 |
| WO | WO 01/60650 A | | 8/2001 |

OTHER PUBLICATIONS

Supplemental European Search Report Application No. EP 02 77 3031 dated Dec. 17, 2004.

* cited by examiner

*Primary Examiner*—Tan Q. Nguyen
(74) *Attorney, Agent, or Firm*—Roberts, Mlotkowski & Hobbes; Thomas W. Cole

(57) ABSTRACT

A car-mounted device control system is obtained which can prevent or lessen erroneous operation of operating portions, switches, and the like during rotation of a steering wheel. When a CPU 16 starts up a function switching program from a storage medium 24 on the basis of an inputted touch signal, a present center control unit 10 compares a comparative rotational position R0 read from the storage medium 24 and a rotational position detection signal R from a steering angle sensor 32. As a result, when the rotational position detection signal R exceeds the comparative rotational position R0, a touch signal and a click signal are cancelled. Thus, inadvertent switching of functions due to a body touching a controller 70 while a steering wheel 22 is rotated can be prevented.

16 Claims, 16 Drawing Sheets

CAR-MOUNTED DEVICE CONTROL SYSTEM

TECHNICAL FIELD

The present invention relates to a car-mounted device control system for controlling a car-mounted device, which is mounted in a car, at an operating means such as a controller or the like which rotates integrally together with a steering wheel.

BACKGROUND TECHNOLOGY

In recent years, various types of devices, such as navigation devices and the like which display the current position and the like of a car on a monitor screen by a control means such as a computer or the like, have been mounted in cars.

As for such various types of devices, the aforementioned devices can be controlled by operating a controller.

On the other hand, it has been thought to mount the controllers of such various types of devices at the steering wheels of cars. In the case of such a structure, there is the merit that the operability improves because switches or the controller can be operated without removing the hands from the steering wheel.

By the way, in a case in which such a controller is provided integrally with the steering wheel for example, when the steering wheel is rotated in order to steer the car, the controller also rotates together therewith. In this case, depending on the mounted position and the like of the controller, the body of the vehicle occupant in the driver's seat (in particular, the palm or finger) interferes with the controller. For this reason, there is the possibility that the aforementioned devices will be operated inadvertently.

On the other hand, among controllers of devices, such as the aforementioned navigation device or the like, of the type at which various more operations are carried out while referring to an image displayed on the screen of a monitor, there are types using a so-called "touch panel".

Such types of controllers have a plate-shaped operation surface. When operation is carried out, a specific position on the operation surface is touched by a finger, or a finger is moved in a state of continuing to touch the operation surface by the finger, and in accordance therewith, switching of the screen or scrolling of the screen or the like is carried out.

By the way, in the case of this type of controller, basically, the controller is the reference for the direction of movement of the finger which the controller detects. Therefore, in a case in which the controller is provided integrally with the steering wheel, even if the finger is moved up, down, left or right on the operation surface, the direction, whose reference is the controller, differs in the state in which the steering wheel is at a neutral position (i.e., the state in which the car can travel straight forward), and in the state in which the steering wheel is rotated.

Therefore, in the state in which the steering wheel is rotated, it is difficult to carry out a desired screen operation or the like, and the possibility of erroneous operation increases.

In view of the aforementioned, an object of the present invention is to provide a car-mounted device control system which can prevent or lessen erroneous operation of an operation portion or a switch or the like at the time the steering wheel is rotated.

DISCLOSURE OF THE INVENTION

In order to achieve the above-described object, the present invention recited in claim 1 is a car-mounted device control system for controlling a predetermined car-mounted device which is mounted in a car, comprising: operating means provided integrally with a steering wheel which steers a car by rotation-operation around a predetermined axis, the operating means having an operation surface whose obverse is a flat surface or a curved surface, and detecting at least a position of an object to be detected on the operation surface, and outputting at least an operation signal corresponding to the position of the object to be detected on the operation surface; rotation detecting means for detecting rotation of the steering wheel; and control means for controlling the car-mounted device on the basis of the operation signal, and nullifying the operation signal on the basis of a rotation detection signal from the rotation detecting means.

The present invention recited in claim 2 is characterized in that, in the car-mounted device control system recited in claim 1, the operating means includes: position detecting means for detecting a position, on the operation surface, of the object to be detected which touches the operation surface; and pressure detecting means for detecting that pressing force of a predetermined magnitude or greater is imparted to the operation surface, and the operation signal includes: a first operation signal outputted from the position detecting means and corresponding to the position of the object to be detected on the operation surface; and a second operation signal outputted from the pressure detecting means in a case in which the pressure imparted to the operation surface is a predetermined magnitude, and the control means nullifies the first operation signal and/or the second operation signal due to the rotation detection signal being inputted.

The present invention recited in claim 3 is characterized in that, in the car-mounted device control system recited in claim 2, the rotation detecting means includes rotational position detecting means for detecting a rotational position of the steering wheel, and outputting a rotational position detection signal, which corresponds to that rotational position, to the control means as the rotation detection signal, and the control means nullifies the first operation signal and/or the second operation signal on the basis of the rotational position detection signal when the steering wheel reaches a predetermined rotational position or when the steering wheel goes beyond the predetermined rotational position.

The present invention recited in claim 4 is characterized in that, in the car-mounted device control system recited in claim 3, the rotation detecting means includes rotational speed detecting means for detecting a rotational speed of the steering wheel, and outputting a rotational speed detection signal, which corresponds to that rotational speed, to the control means as the rotation detection signal, and the control means nullifies the first operation signal and/or the second operation signal on the basis of the rotational speed detection signal in a case in which the rotational speed is a predetermined magnitude or greater.

The present invention recited in claim 5 is characterized in that the car-mounted device control system recited in claim 4 comprises timer means for counting elapsed time from a time when one signal of the rotation detection signal and the operation signal is inputted to the control means, wherein the control means nullifies the operation signal in a case in which, before or after a count value at the timer means reaches a predetermined value, another signal of the rotation detection signal and the operation signal is inputted.

The present invention recited in claim 6 is characterized in that the car-mounted device control system recited in claim 3 comprises timer means for counting elapsed time from a time when one signal of the rotation detection signal and the operation signal is inputted to the control means, wherein the control means nullifies the operation signal in a case in which, before or after a count value at the timer means reaches a predetermined value, another signal of the rotation detection signal and the operation signal is inputted.

The present invention recited in claim 7 is characterized in that, in the car-mounted device control system recited in claim 2, the rotation detecting means includes rotational speed detecting means for detecting a rotational speed of the steering wheel, and outputting a rotational speed detection signal, which corresponds to that rotational speed, to the control means as the rotation detection signal, and the control means nullifies the first operation signal and/or the second operation signal on the basis of the rotational speed detection signal in a case in which the rotational speed is a predetermined magnitude or greater.

The present invention recited in claim 8 is characterized in that the car-mounted device control system recited in claim 7 comprises timer means for counting elapsed time from a time when one signal of the rotation detection signal and the operation signal is inputted to the control means, wherein the control means nullifies the operation signal in a case in which, before or after a count value at the timer means reaches a predetermined value, another signal of the rotation detection signal and the operation signal is inputted.

The present invention recited in claim 9 is characterized in that the car-mounted device control system recited in claim 2 comprises timer means for counting elapsed time from a time when one signal of the rotation detection signal and the operation signal is inputted to the control means, wherein the control means nullifies the operation signal in a case in which, before or after a count value at the timer means reaches a predetermined value, another signal of the rotation detection signal and the operation signal is inputted.

The present invention recited in claim 10 is characterized in that, in the car-mounted device control system recited in claim 1, the rotation detecting means includes rotational position detecting means for detecting a rotational position of the steering wheel, and outputting a rotational position detection signal, which corresponds to that rotational position, to the control means as the rotation detection signal, and the control means nullifies the operation signal on the basis of the rotational position detection signal when the steering wheel reaches a predetermined rotational position or when the steering wheel goes beyond the predetermined rotational position.

The present invention recited in claim 1 is characterized in that, in the car-mounted device control system recited in claim 10, the rotation detecting means includes rotational speed detecting means for detecting a rotational speed of the steering wheel, and outputting a rotational speed detection signal, which corresponds to that rotational speed, to the control means as the rotation detection signal, and the control means nullifies the operation signal on the basis of the rotational speed detection signal in a case in which the rotational speed is a predetermined magnitude or greater.

The present invention recited in claim 12 is characterized in that the car-mounted device control system recited in claim 11 comprises timer means for counting elapsed time from a time when one signal of the rotation detection signal and the operation signal is inputted to the control means, wherein the control means nullifies the operation signal in a case in which, before or after a count value at the timer means reaches a predetermined value, another signal of the rotation detection signal and the operation signal is inputted.

The present invention recited in claim 11 is characterized in that the car-mounted device control system recited in claim 10 comprises timer means for counting elapsed time from a time when one signal of the rotation detection signal and the operation signal is inputted to the control means, wherein the control means nullifies the operation signal in a case in which, before or after a count value at the timer means reaches a predetermined value, another signal of the rotation detection signal and the operation signal is inputted.

The present invention recited in claim 1 is characterized in that, in the car-mounted device control system recited in claim 1, the rotation detecting means includes rotational speed detecting means for detecting a rotational speed of the steering wheel, and outputting a rotational speed detection signal, which corresponds to that rotational speed, to the control means as the rotation detection signal, and the control means nullifies the operation signal on the basis of the rotational speed detection signal in a case in which the rotational speed is a predetermined magnitude or greater.

The present invention recited in claim 12 is characterized in that the car-mounted device control system recited in claim 14 comprises timer means for counting elapsed time from a time when one signal of the rotation detection signal and the operation signal is inputted to the control means, wherein the control means nullifies the operation signal in a case in which, before or after a count value at the timer means reaches a predetermined value, another signal of the rotation detection signal and the operation signal is inputted.

The present invention recited in claim 13 is characterized in that the car-mounted device control system recited in claim 1 comprises timer means for counting elapsed time from a time when one signal of the rotation detection signal and the operation signal is inputted to the control means, wherein the control means nullifies the operation signal in a case in which, before or after a count value at the timer means reaches a predetermined value, another signal of the rotation detection signal and the operation signal is inputted.

The present invention recited in claim 14 is a car-mounted device control system for controlling a predetermined car-mounted device which is mounted in a car, comprising: operating means provided integrally with a steering wheel which steers a car by rotation-operation around a predetermined axis, the operating means having an operation surface whose obverse is a flat surface or a curved surface, and detecting at least a position of an object to be detected on the operation surface, and outputting at least an operation signal corresponding to the position of the object to be detected on the operation surface; rotational position detecting means for detecting a rotational position of the steering wheel; and control means for controlling the car-mounted device on the basis of the operation signal, and correcting the operation signal, on the basis of the rotational position detection signal, in accordance with a rotational position of the operating means.

In the car-mounted device control system recited in claim 1, the operating means which has the operation surface is provided integrally at the steering wheel. When an object to be detected, such as a finger or the like, touches the operation surface of the operating means, at least the position of the object to be detected on the operation surface is detected by the operating means. Further, in this way, when an object to be detected touches the operation surface, at least an operation signal corresponding to the position of the object to be detected on the operation surface is outputted from the operating means. The operation signal outputted from the operating means is inputted either directly or indirectly to the control means. At the control means to which the operation signal has been inputted, a predetermined car-mounted device, which is mounted in the car, is controlled on the basis of the operation signal. In this way, the car-mounted device operates in accordance with operation with respect to the operating means.

On the other hand, in the car-mounted device control system relating to the present invention, when the steering wheel rotates, the rotation of the steering wheel is detected by the rotation detecting means. Moreover, a rotation detection signal, which corresponds to a physical amount such as the amount of rotation (the rotational angle) or the rotational speed or the like of the steering wheel, is outputted from the rotation detecting means which has detected the rotation of the steering wheel. The rotation detection signal outputted from the rotation detecting means is inputted to the control means.

Here, in the car-mounted device control system relating to the present invention, when the rotation detection signal is inputted to the control means, the operation signal, which is inputted to the control means before or after the rotation detection signal is inputted, is nullified by the control means. Therefore, even if the operating means is operated in the state in which the steering wheel is rotating or immediately after the steering wheel rotates or the like, the state of the car-mounted device is not changed.

Accordingly, at the time of a steering operation, there is the possibility that an inadvertent operation will be carried out with respect to the operating means due to the body (e.g., the palm) of the vehicle occupant inadvertently touching the operation surface of the operating means which rotates together with the steering wheel. However, by applying the car-mounted device control system relating to the present invention, even if such an inadvertent operation is carried out, the car-mounted device does not inadvertently operate, and the actual state of the car-mounted device is not changed.

In the car-mounted device control system recited in claim 2, when an object to be detected such as a finger or the like touches the operation surface, the position of the object to be detected on the operation surface is detected by the position detecting means structuring the operating means. Further, a first operation signal, which structures the operation signal and which corresponds to the position of the object to be detected, is outputted from the position detecting means which has detected the object to be detected.

On the other hand, when an object to be detected such as a finger or the like touching the operation surface presses the operation surface as is, and further, at this time, the object to be detected presses the operation surface at a pressing force of a predetermined magnitude or greater, the fact that pressing force of a predetermined value or greater has been imparted to the operation surface is detected by the pressure detecting means. Further, a second operation signal, which, together with the first operation signal, structures the operation signal, is outputted from the pressure detecting means which, as described above, has detected the fact that pressing force of a predetermined value or greater has been imparted.

These first operation signal and second operation signal are inputted to the control means. At the control means, the car-mounted device control is controlled on the basis of the inputted first operation signal and second operation signal.

Moreover, in the car-mounted device control system relating to the present invention, when the rotation detection signal is inputted to the control means, the first operation signal and/or the second operation signal, which was inputted to the control means before or after the rotation detection signal was inputted, is nullified by the control means. Therefore, even if the operating means is operated in the state in which the steering wheel is rotating or immediately after the steering wheel is rotated or the like, the state of the car-mounted device is not changed on the basis of the first operation signal and/or the second operation signal.

In accordance with the car-mounted device control system recited in claim 3, when the steering wheel is rotation-operated, the rotational position of the steering wheel at this time is detected by the rotational position detecting means which structures the rotation detecting means. Further, a rotational position detection signal, which serves as a rotation detection signal corresponding to the rotational position of the steering wheel, is outputted from the rotational position detecting means. Moreover, the rotational position detection signal outputted from the rotational position detecting means is inputted to the control means.

Here, in the car-mounted device control system relating to the present invention, if the rotational position detection signal which is inputted to the control means is a signal corresponding to a case in which the steering wheel has reached a predetermined rotational position or a case in which the steering wheel has been rotated so as to go beyond the predetermined rotational position, the first operation signal and/or the second operation signal, which was inputted to the control means before or after the rotational position detection signal was inputted, is nullified by the control means.

Therefore, in a case in which there is a high possibility that the body of the vehicle occupant such as the palm or the like will touch the operating means at the time when the steering wheel is rotation-operated, such as in the case in which the steering wheel is greatly rotation-operated, even if the body of the vehicle occupant such as the palm or the like touches the operating means, the state of the car-mounted device is not changed on the basis of the first operation signal and/or the second operation signal.

In contrast, in a case in which there is a low possibility that the body of the vehicle occupant such as the palm or the like will touch the operating means at the time when the steering wheel is rotation-operated, such as in the case in which the steering wheel is rotation-operated slightly, it is considered that the vehicle occupant has intentionally operated the operating means, and the state of the car-mounted device can be changed on the basis of the first operation signal and/or the second operation signal.

In this way, in the car-mounted device control system relating to the present invention, it is possible to prevent a change of or a maintaining of the state of the car-mounted device which is not in accordance with the intent of the vehicle occupant.

In accordance with the car-mounted device control system recited in claim 4, when the steering wheel is rotation-operated, the rotational speed of the steering wheel at this time is detected by the rotational speed detecting means which structures the rotation detecting means. Further, a rotational speed detection signal, which serves as a rotation detection signal corresponding to the rotational speed of the steering wheel, is outputted from the rotational speed detecting means. Moreover, the rotational speed detection signal outputted from the rotational speed detecting means is inputted to the control means.

Here, in the car-mounted device control system relating to the present invention, if the rotational speed detection signal inputted to the control means is a signal corresponding to a rotational speed of a predetermined magnitude or greater, the first operation signal and/or the second operation signal, which was inputted to the control means before or after the rotational speed detection signal was inputted, is nullified by the control means.

Namely, in a case in which quick rotation-operation of the steering wheel, such as a so-called sudden turn or the like, is carried out, basically, operation of the operating means cannot be carried out in parallel with the rotation-operation of the steering. Accordingly, it can be thought that, basically, operation of the operating means, which is carried out in parallel with quick rotation-operation of the steering wheel, is due to the body of the vehicle occupant such as the palm or the like inadvertently touching the operating means during the rotation-operation of the steering wheel.

As described above, in the car-mounted device control system relating to the present invention, the first operation signal and/or the second operation signal, which is outputted in operation of the operating means carried out in parallel with quick rotation-operation of the steering wheel such as a sudden turn or the like, is nullified by the control means. Therefore, even if the body of the vehicle occupant such as the palm or the like touches the operating means at the time of quick rotation-operation of the steering wheel such as a sudden turn or the like, the state of the car-mounted device is not changed.

In contrast, in a case in which the steering wheel is rotation-operated relatively slowly, the operating means can be operated even during the rotation-operation of the steering wheel. Accordingly, in the car-mounted device control system relating to the present invention, even if a rotational speed signal, which corresponds to a rotational speed which is less than a predetermined magnitude, is inputted to the control means, the control means changes the state of the car-mounted device on the basis of the first operation signal and/or the second operation signal inputted to the control means before or after the rotational speed detection signal was inputted.

In this way, in the car-mounted device control system relating to the present invention, it is possible to prevent a change of or a maintaining of the state of the car-mounted device which is not in accordance with the intent of the vehicle occupant.

In accordance with the car-mounted device control system recited in claim 5, as described above, when rotation of the steering wheel is detected by the rotation detecting means, the rotation detection signal is outputted from the rotation detecting means. Further, when an object to be detected touches the operation surface of the operating means, the first operation signal, which corresponds to the position of the object to be detected on the operation surface, is outputted from the operating means. Moreover, when the object to be detected presses the operation surface by a pressing force of a predetermined magnitude or greater, the second operation signal is outputted from the operating means.

In this way, the rotation detection signal outputted from the rotation detecting means and the operation signal (the first operation signal, the second operation signal) outputted from the operating means are inputted to the control means.

Here, in the car-mounted device control system relating to the present invention, when one signal of the rotation detection signal and the operation signal (the first operation signal and/or the second operation signal) is inputted to the control means, the timer means is activated. In this way, the elapsed time from the time that the one signal was inputted to the control means is counted.

Moreover, when the other signal of the rotation detection signal and the operation signal (the first operation signal and/or the second operation signal) is inputted to the control means before or after a predetermined time has elapsed from the start of counting by the timer means in this way (i.e., before or after the count value has reached a predetermined value), the operation signal inputted to the control means is nullified by the control means.

Namely, in a case in which the one signal is the rotation detection signal and the other signal is the operation signal (the first operation signal and/or the second operation signal) even if the operating means is operated before or after a predetermined time has elapsed from the time that the rotation-operation of the steering wheel was carried out, the operation signal outputted from the operating means is nullified at the control means.

Therefore, even if the body of the vehicle occupant such as the palm or the like touches the operating means due to the vehicle occupant re-grasping the steering wheel during the steering operation or at the time of completion of the steering operation or the like, the state of the car-mounted device is not changed.

In contrast, in a case in which the one signal is the operation signal (the first operation signal and/or the second operation signal) and the other signal is the rotation detection signal, when the steering wheel is rotation-operated before or after a predetermined time has elapsed from the time the operating means was operated, the operation signal outputted from the operating means is nullified at the control means. In this way, even if the state of the car-mounted device is changed due to the operating means being operated, it is restored to the original state.

Therefore, even if the state of the car-mounted device is changed once due to the body of the vehicle occupant such as the palm or the like touching the operating means due to the vehicle occupant re-grasping the steering wheel at the start of steering, by restoring the state to the original state, as a result, it is possible to prevent the state of the car-mounted device from being changed.

In accordance with the car-mounted device control system recited in claim 6, as described above, when the rotation of the steering wheel is detected by the rotation detecting means, the rotation detection signal is outputted from the rotation detecting means. Further, when the object to be detected touches the operation surface of the operating means, the first operation signal corresponding to the position of the object to be detected on the operation surface is outputted from the operating means. Moreover, when the object to be detected presses the operation surface by a pressing force which is a predetermined magnitude or greater, the second operation signal is outputted from the operating means.

In this way, the rotation detection signal outputted from the rotation detecting means and the operation signal (the first operation signal, the second operation signal) outputted from the operating means are inputted to the control means.

Here, in the car-mounted device control system relating to the present invention, when one signal of the rotation detection signal and the operation signal (the first operation signal and/or the second operation signal) is inputted to the control means, the timer means is activated. In this way, the elapsed time from the time that one signal was inputted to the control means is counted.

Moreover, when the other signal of the rotation detection signal and the operation signal (the first operation signal and/or the second operation signal) is inputted to the control means before or after a predetermined time has elapsed from the start of counting by the timer means in this way (i.e., before or after the count value has reached a predetermined value), the operation signal inputted to the control means is nullified by the control means.

Namely, in a case in which the one signal is the rotation detection signal and the other signal is the operation signal (the first operation signal and/or the second operation signal), even if the operating means is operated before or after a predetermined time has elapsed from the time that the rotation-operation of the steering wheel was carried out, the operation signal outputted from the operating means is nullified at the control means.

Therefore, even if the body of the vehicle occupant such as the palm or the like touches the operating means due to the vehicle occupant re-grasping the steering wheel during the steering operation or at the time of completion of the steering operation or the like, the state of the car-mounted device is not changed.

In contrast, in a case in which the one signal is the operation signal (the first operation signal and/or the second operation signal) and the other signal is the rotation detection signal, when the steering wheel is rotation-operated before or after a predetermined time has elapsed from the time the operating means was operated, the operation signal outputted from the operating means is nullified at the control means. In this way, even if the state of the car-mounted device is changed due to the operating means being operated, it is restored to the original state.

Therefore, even if the state of the car-mounted device is changed once due to the body of the vehicle occupant such as the palm or the like touching the operating means due to the vehicle occupant re-grasping the steering wheel at the start of steering, by restoring the state to the original state, as a result, it is possible to prevent the state of the car-mounted device from being changed.

In accordance with the car-mounted device control system recited in claim 7, when the steering wheel is rotation-operated, the rotational speed of the steering wheel at this time is detected by the rotational speed detecting means structuring the rotation detecting means. Further, the rotational speed detection signal, which serves as a rotation detection signal corresponding to the rotational speed of the steering wheel, is outputted from the rotational speed detecting means. Moreover, the rotational speed detection signal outputted from the rotational speed detecting means is inputted to the control means.

Here, in the car-mounted device control system relating to the present invention, if the rotational speed detection signal inputted to the control means is a signal corresponding to a rotational speed of a predetermined magnitude or greater, the first operation signal and/or the second operation signal, which was inputted to the control means before or after the rotational speed detection signal was inputted, is nullified by the control means.

Namely, in a case in which quick rotation-operation of the steering wheel, such as a so-called sudden turn or the like, is carried out, basically, operation of the operating means cannot be carried out in parallel with the rotation-operation of the steering. Accordingly, it can be thought that, basically, operation of the operating means, which is carried out in parallel with quick rotation-operation of the steering wheel, is due to the body of the vehicle occupant such as the palm or the like inadvertently touching the operating means during the rotation-operation of the steering wheel.

As described above, in the car-mounted device control system relating to the present invention, the first operation signal and/or the second operation signal, which is outputted in operation of the operating means carried out in parallel with quick rotation-operation of the steering wheel such as a sudden turn or the like, is nullified by the control means. Therefore, even if the body of the vehicle occupant such as the palm or the like touches the operating means at the time of quick rotation-operation of the steering wheel such as a sudden turn or the like, the state of the car-mounted device is not changed.

In contrast, in a case in which the steering wheel is rotation-operated relatively slowly, the operating means can be operated even during the rotation-operation of the steering wheel. Accordingly, in the car-mounted device control system relating to the present invention, even if a rotational speed signal, which corresponds to a rotational speed which is less than a predetermined magnitude, is inputted to the control means, the control means changes the state of the car-mounted device on the basis of the first operation signal and/or the second operation signal inputted to the control means before or after the rotational speed detection signal was inputted.

In this way, in the car-mounted device control system relating to the present invention, it is possible to prevent a change of or a maintaining of the state of the car-mounted device which is not in accordance with the intent of the vehicle occupant.

In accordance with the car-mounted device control system recited in claim 8, as described above, when rotation of the steering wheel is detected by the rotation detecting means, the rotation detection signal is outputted from the rotation detecting means. Further, when an object to be detected touches the operation surface of the operating means, the first operation signal corresponding to the position of the object to be detected on the operation surface is outputted from the operating means. Moreover, when the object to be detected presses the operation surface by a pressing force of a predetermined magnitude or greater, the second operation signal is outputted from the operating means.

In this way, the rotation detection signal outputted from the rotation detecting means and the operation signal (the first operation signal, the second operation signal) outputted from the operating means are inputted to the control means.

Here, in the car-mounted device control system relating to the present invention, when one signal of the rotation detection signal and the operation signal (the first operation signal and/or the second operation signal) is inputted to the control means, the timer means is activated. In this way, the elapsed time from the time that the one signal was inputted to the control means is counted.

Moreover, when the other signal of the rotation detection signal and the operation signal (the first operation signal and/or the second operation signal) is inputted to the control means before or after a predetermined time has elapsed from the start of counting by the timer means in this way (i.e., before or after the count value has reached a predetermined value), the operation signal inputted to the control means is nullified by the control means.

Namely, in a case in which the one signal is the rotation detection signal and the other signal is the operation signal (the first operation signal and/or the second operation signal), even if the operating means is operated before or after a predetermined time has elapsed from the time that the rotation-operation of the steering wheel was carried out, the operation signal outputted from the operating means is nullified at the control means.

Therefore, even if the body of the vehicle occupant such as the palm or the like touches the operating means due to the vehicle occupant re-grasping the steering wheel during the steering operation or at the time of completion of the steering operation or the like, the state of the car-mounted device is not changed.

In contrast, in a case in which the one signal is the operation signal (the first operation signal and/or the second operation signal) and the other signal is the rotation detection signal, when the steering wheel is rotation-operated before or after a predetermined time has elapsed from the time the operating means was operated, the operation signal outputted from the operating means is nullified at the control means. In this way, even if the state of the car-mounted device is changed due to the operating means being operated, it is restored to the original state.

Therefore, even if the state of the car-mounted device is changed once due to the body of the vehicle occupant such as the palm or the like touching the operating means due to the vehicle occupant re-grasping the steering wheel at the start of steering, by restoring the state to the original state, as a result, it is possible to prevent the state of the car-mounted device from being changed.

In accordance with the car-mounted device control system recited in claim 9, as described above, when rotation of the steering wheel is detected by the rotation detecting means, the rotation detection signal is outputted from the rotation detecting means. Further, when an object to be detected touches the operation surface of the operating means, the first operation signal corresponding to the position of the object to be detected on the operation surface is outputted from the operating means. Moreover, when the object to be detected presses the operation surface by a pressing force of a predetermined magnitude or greater, the second operation signal is outputted from the operating means.

In this way, the rotation detection signal outputted from the rotation detecting means and the operation signal (the first operation signal, the second operation signal) outputted from the operating means are inputted to the control means.

Here, in the car-mounted device control system relating to the present invention, when one signal of the rotation detection signal and the operation signal (the first operation signal and/or the second operation signal) is inputted to the control means, the timer means is activated. In this way, the elapsed time from the time that that one signal was inputted to the control means is counted.

Moreover, when the other signal of the rotation detection signal and the operation signal (the first operation signal and/or the second operation signal) is inputted to the control means before or after a predetermined time has elapsed from the start of counting by the timer means in this way (i.e., before or after the count value has reached a predetermined value), the operation signal inputted to the control means is nullified by the control means.

Namely, in a case in which the one signal is the rotation detection signal and the other signal is the operation signal (the first operation signal and/or the second operation signal), even if the operating means is operated before or after a predetermined time has elapsed from the time that the rotation-operation of the steering wheel was carried out, the operation signal outputted from the operating means is nullified at the control means.

Therefore, even if the body of the vehicle occupant such as the palm or the like touches the operating means due to the vehicle occupant re-grasping the steering wheel during the steering operation or at the time of completion of the steering operation or the like, the state of the car-mounted device is not changed.

In contrast, in a case in which the one signal is the operation signal (the first operation signal and/or the second operation signal) and the other signal is the rotation detection signal, when the steering wheel is rotation-operated before or after a predetermined time has elapsed from the time the operating means was operated, the operation signal outputted from the operating means is nullified at the control means. In this way, even if the state of the car-mounted device is changed due to the operating means being operated, it is restored to the original state.

Therefore, even if the state of the car-mounted device is changed once due to the body of the vehicle occupant such as the palm or the like touching the operating means due to the vehicle occupant re-grasping the steering wheel at the start of steering, by restoring the state to the original state, as a result, it is possible to prevent the state of the car-mounted device from being changed.

In accordance with the car-mounted device control system recited in claim 10, when the steering wheel is rotation-operated, the rotational position of the steering wheel at this time is detected by the rotational position detecting means structuring the rotation detecting means. Further, a rotational position detection signal, which serves as a rotation detection signal corresponding to the rotational position of the steering wheel, is outputted from the rotational position detecting means. Moreover, the rotational position detection signal outputted from the rotational position detecting means is inputted to the control means.

Here, in the car-mounted device control system relating to the present invention, if the rotational position detection signal which is inputted to the control means is a signal corresponding to a case in which the steering wheel has reached a predetermined rotational position or a case in which the steering wheel has been rotated so as to go beyond the predetermined rotational position, the operation signal, which was inputted to the control means before or after the rotational position detection signal was inputted, is nullified by the control means.

Therefore, in a case in which there is a high possibility that the body of the vehicle occupant such as the palm or the like will touch the operating means at the time when the steering wheel is rotation-operated, such as in the case in which the steering wheel is greatly rotation-operated, even if the body of the vehicle occupant such as the palm or the like touches the operating means, the state of the car-mounted device is not changed on the basis of the operation signal.

In contrast, in a case in which there is a low possibility that the body of the vehicle occupant such as the palm or the like will touch the operating means at the time when the steering wheel is rotation-operated, such as in the case in which the steering wheel is rotation-operated slightly, it is considered that the vehicle occupant has intentionally operated the operating means, and the state of the car-mounted device can be changed on the basis of the operation signal.

In this way, in the car-mounted device control system relating to the present invention, it is possible to prevent a change of or a maintaining of the state of the car-mounted device which is not in accordance with the intent of the vehicle occupant.

In the car-mounted device control system recited in claim 1, when the steering wheel is rotation-operated, the rotational speed of the steering wheel at this time is detected by the rotational speed detecting means which structures the rotation detecting means. Further, a rotational speed detection signal, which serves as a rotation detection signal corresponding to the rotational speed of the steering wheel, is outputted from the rotational speed detecting means. Moreover, the rotational speed detection signal outputted from the rotational speed detecting means is inputted to the control means.

Here, in the car-mounted device control system relating to the present invention, if the rotational speed detection signal inputted to the control means is a signal corresponding to a rotational speed of a predetermined magnitude or greater, the operation signal, which was inputted to the control means before or after the rotational speed detection signal was inputted, is nullified by the control means.

Namely, in a case in which quick rotation-operation of the steering wheel, such as a so-called sudden turn or the like, is carried out, basically, operation of the operating means cannot be carried out in parallel with the rotation-operation of the steering. Accordingly, it can be thought that, basically, operation of the operating means, which is carried out in parallel with quick rotation-operation of the steering wheel, is due to the body of the vehicle occupant such as the palm or the like inadvertently touching the operating means during the rotation-operation of the steering wheel.

As described above, in the car-mounted device control system relating to the present invention, the operation signal, which is outputted by operation of the operating means carried out in parallel with quick rotation-operation of the steering wheel such as a sudden turn or the like, is nullified by the control means. Therefore, even if the body of the vehicle occupant such as the palm or the like touches the operating means at the time of quick rotation-operation of the steering wheel such as a sudden turn or the like, the state of the car-mounted device is not changed.

In contrast, in a case in which the steering wheel is rotation-operated relatively slowly, the operating means can be operated even during the rotation-operation of the steering wheel. Accordingly, in the car-mounted device control system relating to the present invention, even if a rotational speed signal, which corresponds to a rotational speed which is less than a predetermined magnitude, is inputted to the control means, the control means changes the state of the car-mounted device on the basis of the operation signal inputted to the control means before or after the rotational speed detection signal was inputted.

In this way, in the car-mounted device control system relating to the present invention, it is possible to prevent a change of or a maintaining of the state of the car-mounted device which is not in accordance with the intent of the vehicle occupant.

In accordance with the car-mounted device control system recited in claim 11, as described above, when rotation of the steering wheel is detected by the rotation detecting means, the rotation detection signal is outputted from the rotation detecting means. Further, when an object to be detected touches the operation surface of the operating means, at least the operation signal corresponding to the position of the object to be detected on the operation surface is outputted from the operating means.

In this way, the rotation detection signal outputted from the rotation detecting means and the operation signal outputted from the operating means are inputted to the control means.

Here, in the car-mounted device control system relating to the present invention, when one signal of the rotation detection signal and the operation signal is inputted to the control means, the timer means is activated. In this way, the elapsed time from the time that that one signal was inputted to the control means is counted.

Moreover, when the other signal of the rotation detection signal and the operation signal is inputted to the control means before or after a predetermined time has elapsed from the start of counting by the timer means in this way (i.e., before or after the count value has reached a predetermined value), the operation signal inputted to the control means is nullified by the control means.

Namely, in a case in which the one signal is the rotation detection signal and the other signal is the operation signal, even if the operating means is operated before or after a predetermined time has elapsed from the time that the rotation-operation of the steering wheel was carried out, the operation signal outputted from the operating means is nullified at the control means.

Therefore, even if the body of the vehicle occupant such as the palm or the like touches the operating means due to the vehicle occupant re-grasping the steering wheel during the steering operation or at the time of completion of the steering operation or the like, the state of the car-mounted device is not changed.

In contrast, in a case in which the one signal is the operation signal and the other signal is the rotation detection signal, when the steering wheel is rotation-operated before or after a predetermined time has elapsed from the time the operating means was operated, the operation signal outputted from the operating means is nullified at the control means. In this way, even if the state of the car-mounted device is changed due to the operating means being operated, it is restored to the original state.

Therefore, even if the state of the car-mounted device is changed once due to the body of the vehicle occupant such as the palm or the like touching the operating means due to the vehicle occupant re-grasping the steering wheel at the start of steering, by restoring the state to the original state, as a result, it is possible to prevent the state of the car-mounted device from being changed.

In accordance with the car-mounted device control system recited in claim 13, as described above, when rotation of the steering wheel is detected by the rotation detecting means, the rotation detection signal is outputted from the rotation detecting means. Further, when an object to be detected touches the operation surface of the operating means, at least the operation signal corresponding to the position of the object to be detected on the operation surface is outputted from the operating means.

In this way, the rotation detection signal outputted from the rotation detecting means and the operation signal outputted from the operating means are inputted to the control means.

Here, in the car-mounted device control system relating to the present invention, when one signal of the rotation detection signal and the operation signal is inputted to the control means, the timer means is activated. In this way, the elapsed time from the time that that one signal was inputted to the control means is counted.

Moreover, when the other signal of the rotation detection signal and the operation signal is inputted to the control means before or after a predetermined time has elapsed from the start of counting by the timer means in this way (i.e., before or after the count value has reached a predetermined value), the operation signal inputted to the control means is nullified by the control means.

Namely, in a case in which the one signal is the rotation detection signal and the other signal is the operation signal, even if the operating means is operated before or after a predetermined time has elapsed from the time that the rotation-operation of the steering wheel was carried out, the operation signal outputted from the operating means is nullified at the control means.

Therefore, even if the body of the vehicle occupant such as the palm or the like touches the operating means due to the vehicle occupant re-grasping the steering wheel during the steering operation or at the time of completion of the steering operation or the like, the state of the car-mounted device is not changed.

In contrast, in a case in which the one signal is the operation signal and the other signal is the rotation detection signal, when the steering wheel is rotation-operated before or after a predetermined time has elapsed from the time the operating means was operated, the operation signal outputted from the operating means is nullified at the control means. In this way, even if the state of the car-mounted device is changed due to the operating means being operated, it is restored to the original state.

Therefore, even if the state of the car-mounted device is changed once due to the body of the vehicle occupant such as the palm or the like touching the operating means due to the vehicle occupant re-grasping the steering wheel at the start of steering, by restoring the state to the original state, as a result, it is possible to prevent the state of the car-mounted device from being changed.

In accordance with the car-mounted device control system recited in claim 1, when the steering wheel is rotation-operated, the rotational speed of the steering wheel at this time is detected by the rotational speed detecting means structuring the rotation detecting means. Further, the rotational speed detection signal, which serves as a rotation detection signal corresponding to the rotational speed of the steering wheel, is outputted from the rotational speed detecting means. Moreover, the rotational speed detection signal outputted from the rotational speed detecting means is inputted to the control means.

Here, in the car-mounted device control system relating to the present invention, if the rotational speed detection signal inputted to the control means is a signal corresponding to a rotational speed of a predetermined magnitude or greater, the operation signal, which was inputted to the control means before or after the rotational speed detection signal was inputted, is nullified by the control means.

Namely, in a case in which quick rotation-operation of the steering wheel, such as a so-called sudden turn or the like, is carried out, basically, operation of the operating means cannot be carried out in parallel with the rotation-operation of the steering. Accordingly, it can be thought that, basically, operation of the operating means, which is carried out in parallel with quick rotation-operation of the steering wheel, is due to the body of the vehicle occupant such as the palm or the like inadvertently touching the operating means during the rotation-operation of the steering wheel.

As described above, in the car-mounted device control system relating to the present invention, the operation signal, which is outputted by operation of the operating means carried out in parallel with quick rotation-operation of the steering wheel such as a sudden turn or the like, is nullified by the control means. Therefore, even if the body of the vehicle occupant such as the palm or the like touches the operating means at the time of quick rotation-operation of the steering wheel such as a sudden turn or the like, the state of the car-mounted device is not changed.

In contrast, in a case in which the steering wheel is rotation-operated relatively slowly, the operating means can be operated even during the rotation-operation of the steering wheel. Accordingly, in the car-mounted device control system relating to the present invention, even if a rotational speed signal, which corresponds to a rotational speed which is less than a predetermined magnitude, is inputted to the control means, the control means changes the state of the car-mounted device on the basis of the operation signal inputted to the control means before or after the rotational speed detection signal was inputted.

In this way, in the car-mounted device control system relating to the present invention, it is possible to prevent a change of or a maintaining of the state of the car-mounted device which is not in accordance with the intent of the vehicle occupant.

In accordance with the car-mounted device control system recited in claim 12, as described above, when rotation of the steering wheel is detected by the rotation detecting means, the rotation detection signal is outputted from the rotation detecting means. Further, when an object to be detected touches the operation surface of the operating means, at least the operation signal corresponding to the position of the object to be detected on the operation surface is outputted from the operating means.

In this way, the rotation detection signal outputted from the rotation detecting means and the operation signal outputted from the operating means are inputted to the control means.

Here, in the car-mounted device control system relating to the present invention, when one signal of the rotation detection signal and the operation signal is inputted to the control means, the timer means is activated. In this way, the elapsed time from the time that that one signal was inputted to the control means is counted.

Moreover, when the other signal of the rotation detection signal and the operation signal is inputted to the control means before or after a predetermined time has elapsed from the start of counting by the timer means in this way (i.e., before or after the count value has reached a predetermined value), the operation signal inputted to the control means is nullified by the control means.

Namely, in a case in which the one signal is the rotation detection signal and the other signal is the operation signal, even if the operating means is operated before or after a predetermined time has elapsed from the time that the rotation-operation of the steering wheel was carried out, the operation signal outputted from the operating means is nullified at the control means.

Therefore, even if the body of the vehicle occupant such as the palm or the like touches the operating means due to the vehicle occupant re-grasping the steering wheel during the steering operation or at the time of completion of the steering operation or the like, the state of the car-mounted device is not changed.

In contrast, in a case in which the one signal is the operation signal and the other signal is the rotation detection signal, when the steering wheel is rotation-operated before or after a predetermined time has elapsed from the time the operating means was operated, the operation signal outputted from the operating means is nullified at the control means. In this way, even if the state of the car-mounted device is changed due to the operating means being operated, it is restored to the original state.

Therefore, even if the state of the car-mounted device is changed once due to the body of the vehicle occupant such as the palm or the like touching the operating means due to the vehicle occupant re-grasping the steering wheel at the start of steering, by restoring the state to the original state, as a result, it is possible to prevent the state of the car-mounted device from being changed.

In accordance with the car-mounted device control system recited in claim 13, as described above, when rotation of the steering wheel is detected by the rotation detecting means, the rotation detection signal is outputted from the rotation detecting means. Further, when an object to be detected touches the operation surface of the operating means, at least the operation signal corresponding to the position of the object to be detected on the operation surface is outputted from the operating means.

In this way, the rotation detection signal outputted from the rotation detecting means and the operation signal outputted from the operating means are inputted to the control means.

Here, in the car-mounted device control system relating to the present invention, when one signal of the rotation detection signal and the operation signal is inputted to the control means, the timer means is activated. In this way, the elapsed time from the time that the one signal was inputted to the control means is counted.

Moreover, when the other signal of the rotation detection signal and the operation signal is inputted to the control means before or after a predetermined time has elapsed from the start of counting by the timer means in this way (i.e., before or after the count value has reached a predetermined value), the operation signal inputted to the control means is nullified by the control means.

Namely, in a case in which the one signal is the rotation detection signal and the other signal is the operation signal, even if the operating means is operated before or after a predetermined time has elapsed from the time that the rotation-operation of the steering wheel was carried out, the operation signal outputted from the operating means is nullified at the control means.

Therefore, even if the body of the vehicle occupant such as the palm or the like touches the operating means due to the vehicle occupant re-grasping the steering wheel during the steering operation or at the time of completion of the steering operation or the like, the state of the car-mounted device is not changed.

In contrast, in a case in which the one signal is the operation signal and the other signal is the rotation detection signal, when the steering wheel is rotation-operated before or after a predetermined time has elapsed from the time the operating means was operated, the operation signal outputted from the operating means is nullified at the control means. In this way, even if the state of the car-mounted device is changed due to the operating means being operated, it is restored to the original state.

Therefore, even if the state of the car-mounted device is changed once due to the body of the vehicle occupant such as the palm or the like touching the operating means due to the vehicle occupant re-grasping the steering wheel at the start of steering, by restoring the state to the original state, as a result, it is possible to prevent the state of the car-mounted device from being changed.

In the car-mounted device control system recited in claim 14, the operating means which has the operation surface is provided integrally at the steering wheel. When an object to be detected, such as a finger or the like, touches the operation surface of the operating means, at least the position of the object to be detected on the operation surface is detected by the operating means. Further, in this way, when the object to be detected touches the operation surface, at least an operation signal corresponding to the position of the object to be detected on the operation surface is outputted from the operating means. The operation signal outputted from the operating means is inputted either directly or indirectly to the control means. At the control means to which the operation signal has been inputted, a predetermined car-mounted device, which is mounted in the car, is controlled on the basis of the operation signal. In this way, the car-mounted device operates in accordance with operation with respect to the operating means.

On the other hand, in the car-mounted device control system relating to the present invention, when the steering wheel rotates, the rotational position (rotational angle) of the steering wheel is detected by the rotational position detecting means. Moreover, a rotation detection signal, which corresponds to the rotational position of the steering wheel, is outputted from the rotational position detecting means which detected the rotational position of the steering wheel. The rotation detection signal outputted from the rotational position detecting means is inputted to the control means.

Here, in the car-mounted device control system relating to the present invention, when the operation signal and the rotational position detection signal are inputted to the control means, the operation signal is corrected by the control means on the basis of the rotational position (rotational angle) of the steering wheel.

Accordingly, even if the position (coordinate position) of the object to be detected on the operation surface whose reference is the vehicle occupant, and the position (coordinate position) of the object to be detected on the operation surface whose reference is the operating means which has rotated together with the steering wheel, differ due to the steering wheel rotating, by correcting the operation signal as described above, the operation signal becomes the position (coordinate position) of the object to be detected whose reference is the vehicle occupant. Therefore, control of the car-mounted device, which control is suited to the sense of operation of the vehicle occupant at the time when the object to be detected such as a finger or the like is placed on the operation surface or the time when the object to be detected such as a finger or the like is moved on the operation surface, is possible.

BEST MODES FOR IMPLEMENTING THE INVENTION

<System Structure of First Embodiment>

Figure 1:
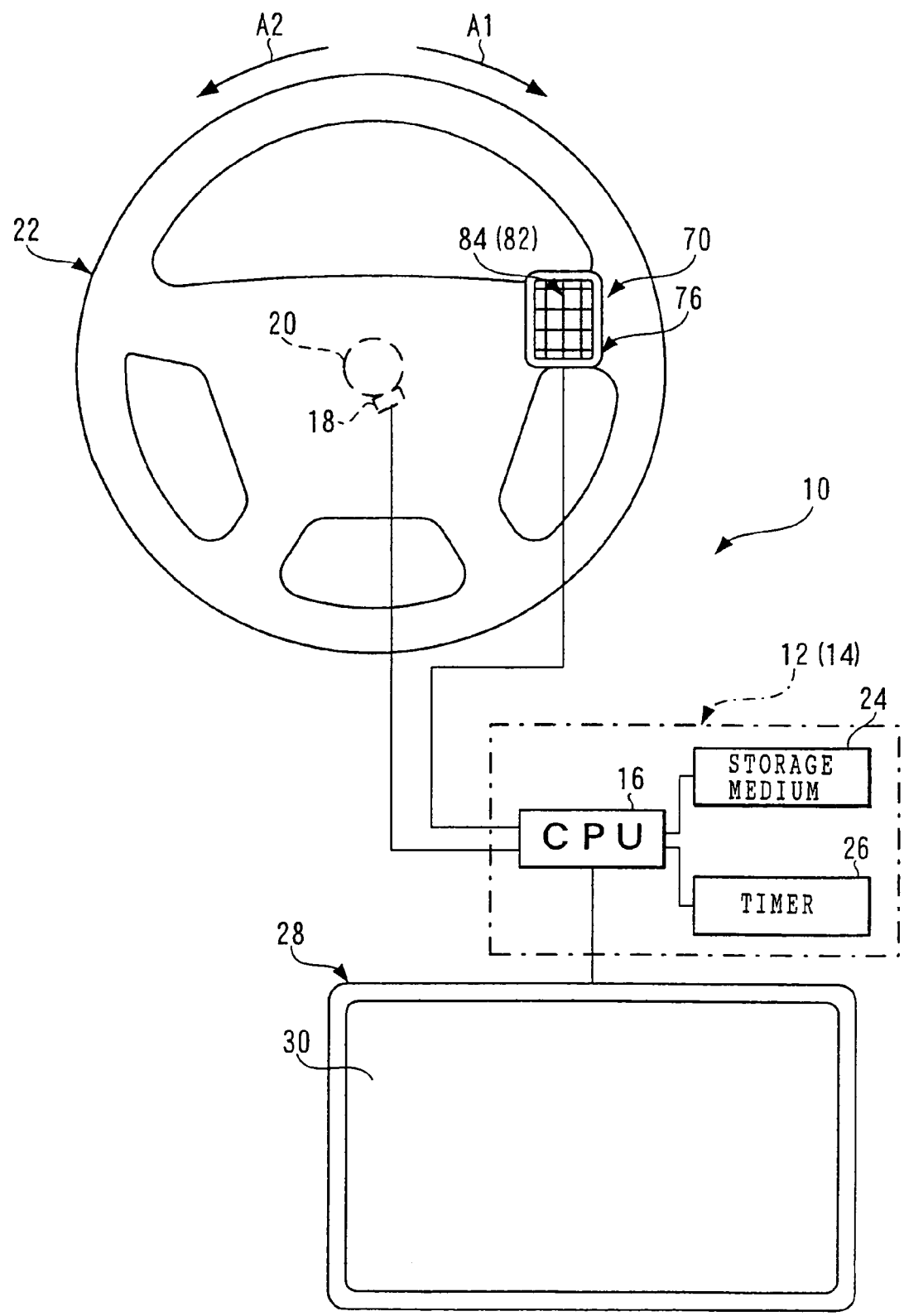
FIG. 1 is a composite diagram of a plan view and a block diagram showing a summary of the structure of a car-mounted device to which is applied a car-mounted device control system relating to a first embodiment of the present invention.

A summary of the structure of a center control unit 10, which serves as a car-mounted device to which is applied a car-mounted device control system relating to a first embodiment of the present invention, is shown in a block diagram in FIG. 1.

As shown in this figure, the present center control unit 10 is equipped with a device main body 14 which is structured so as to include a computer 12 serving as a control means. The computer 12 is accommodated at the interior of the device main body 14 which is formed in a substantial box shape. Further, the device main body 14 is accommodated in an accommodating portion formed at the instrument panel of the car.

The computer 12 has a CPU 16. The CPU 16 is connected directly or indirectly to a steering angle sensor 18 which structures a rotation detecting means serving as a rotational position detecting means. The steering angle sensor 18 is provided in a vicinity of a steering shaft 20. A steering wheel 22 is connected coaxially and integrally with the steering shaft 20. When the steering wheel 22 is rotation-operated, the steering shaft 20 rotates. Steering operation of the car is thereby carried out. The steering angle sensor 18 detects the rotational angle of the steering shaft 20 at the time when the steering shaft 20 rotates. The steering angle sensor 18 is structured to detect the rotational angle of the steering wheel 22 on the basis of the detected rotational angle of the steering shaft 20. The steering angle sensor 18 outputs an electrical angle detection signal (voltage or the like) corresponding to the detected rotational angle of the steering shaft 20. The angle detection signal outputted from the steering angle sensor 18 is inputted to the CPU 16.

The CPU 16 is connected to a storage medium 24. Various programs and data are stored in advance in the storage medium 24. The CPU 16 reads the programs and the data stored in the storage medium 24, and processes and executes them. Moreover, the CPU 16 is connected to a timer 26 serving as a timer means. The timer 26 is used during the execution of programs at the CPU 16. Note that, with regard to the timer 26, a structure equipped structurally with the timer 26 may be used, or the timer 26 may be structured by a software timer program. In the case of structuring the timer 26 by a software timer program, the timer 26 is structured to store the timer program in the same way as the storage medium 24.

On the other hand, the present center control unit 10 is equipped with a monitor television 28 serving as a monitor means. The monitor television 28 is set at a predetermined place, including on the instrument panel of the car, such that a screen 30 can be seen from the driver's seat or the like. The monitor television 28 is connected to the CPU 16 of the device main body 14 via a connecting means such as a flat cable or the like, and can display the results of processing and the results of execution at the CPU 16.

Figure 5:
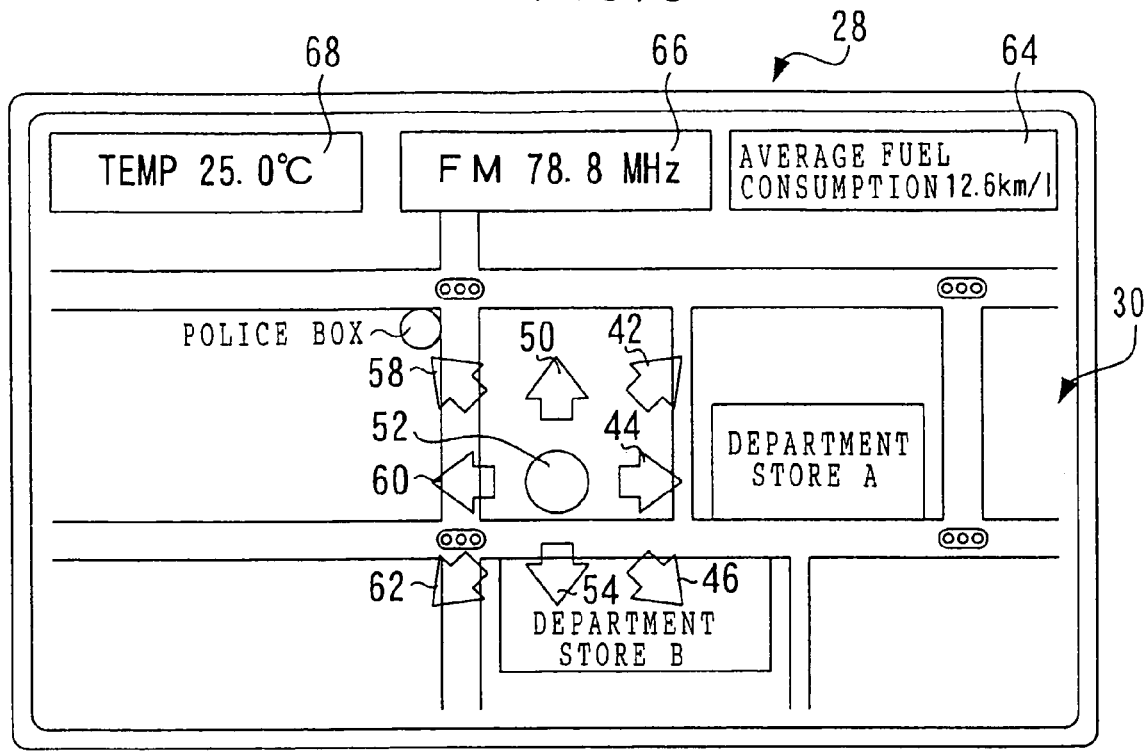
FIG. 5 is a diagram showing an example of display contents at a monitor means.

Concretely, for example, in a case in which the CPU 16 reads a car navigation program from the storage medium 24, as shown in FIG. 5, the CPU 16 expands map data or the like as a main screen, and displays function switching buttons 64, 66, 68 and selection buttons 42, 44, 46, 50, 52, 54, 58, 60, 62 on the monitor television 28.

Figure 6:
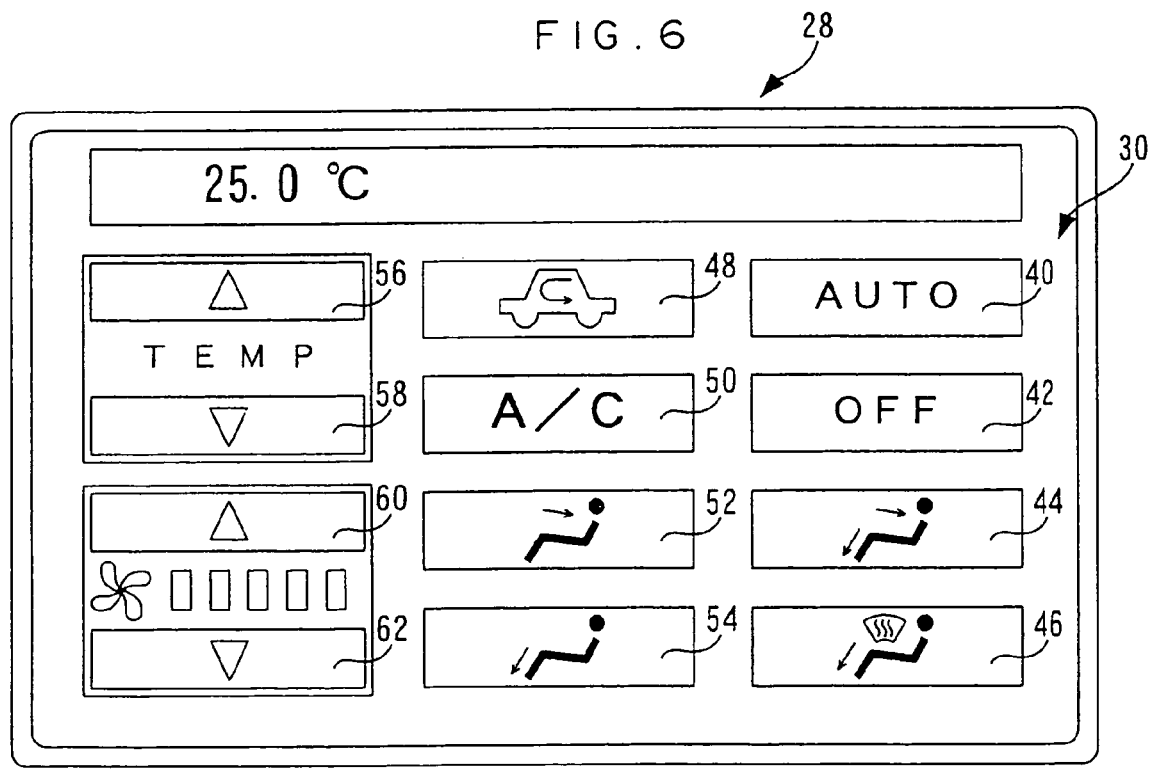
FIG. 6 is a diagram showing another example of display contents at a monitor means.

Further, in a case in which the CPU 16 reads an air conditioning operation program from the storage medium 24, as shown in FIG. 6, the plurality of selection buttons 40, 42, 44, 46, 48, 50, 52, 54, 56, 58, 60, 62, which bear the names of the respective types of functions which the air conditioning device mounted in the car has, are displayed in a matrix form (4 rows and 3 columns in the present embodiment).

Moreover, as shown in FIG. 1, the present center control unit 10 is equipped with a controller 70 serving as an operating means.

As shown in FIG. 1, the controller 70 is equipped with a case 72. The case 72 is fixed integrally to the steering wheel 22 in a vicinity of a rim portion 22A of the steering wheel 22. Therefore, when the steering wheel 22 rotates, the case 72 and the controller 70 rotate integrally with the steering wheel 22.

Figure 2:
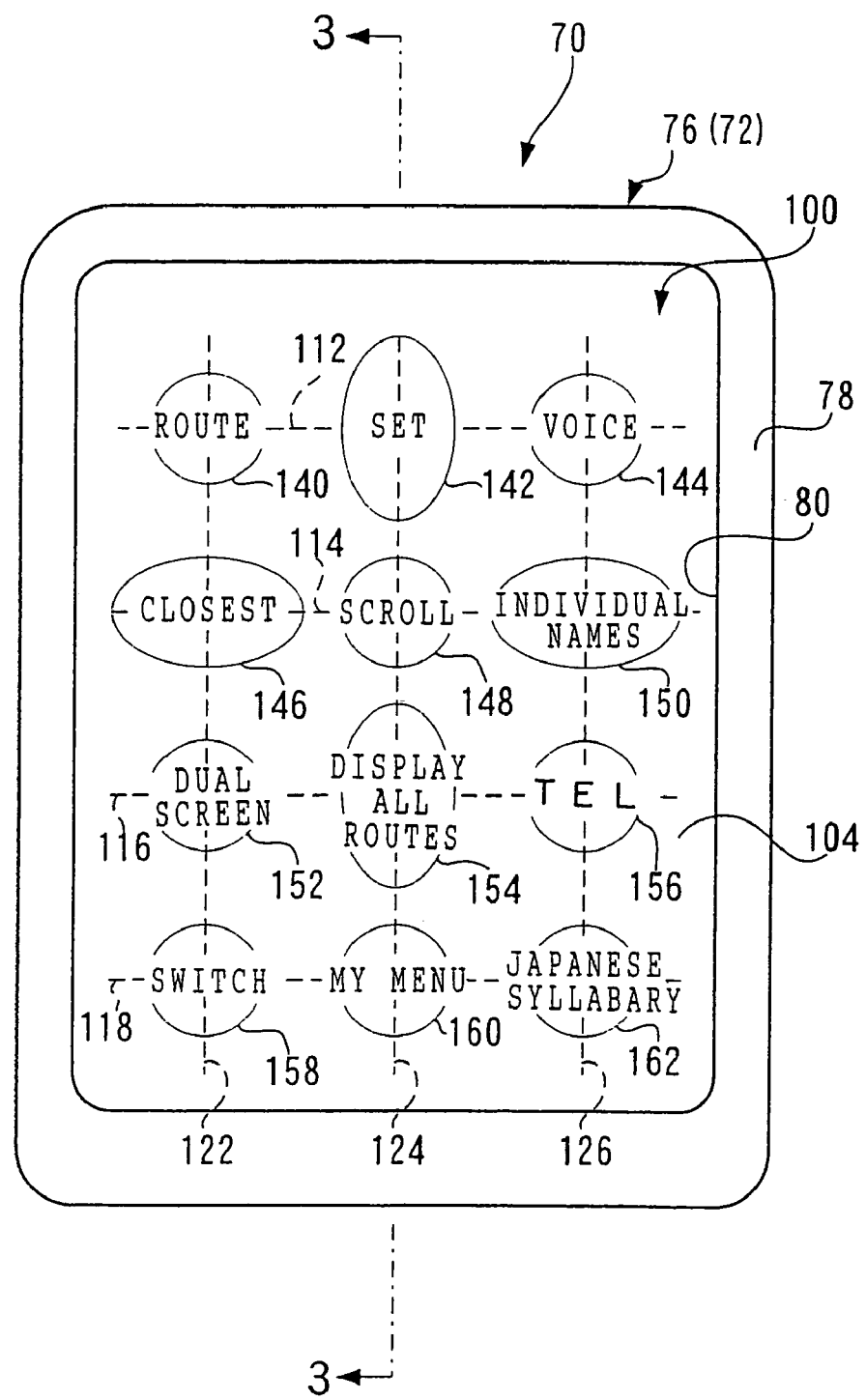
FIG. 2 is a plan view in which an operating means of the car-mounted device control system relating to the first embodiment of the present invention is enlarged.
Figure 3:
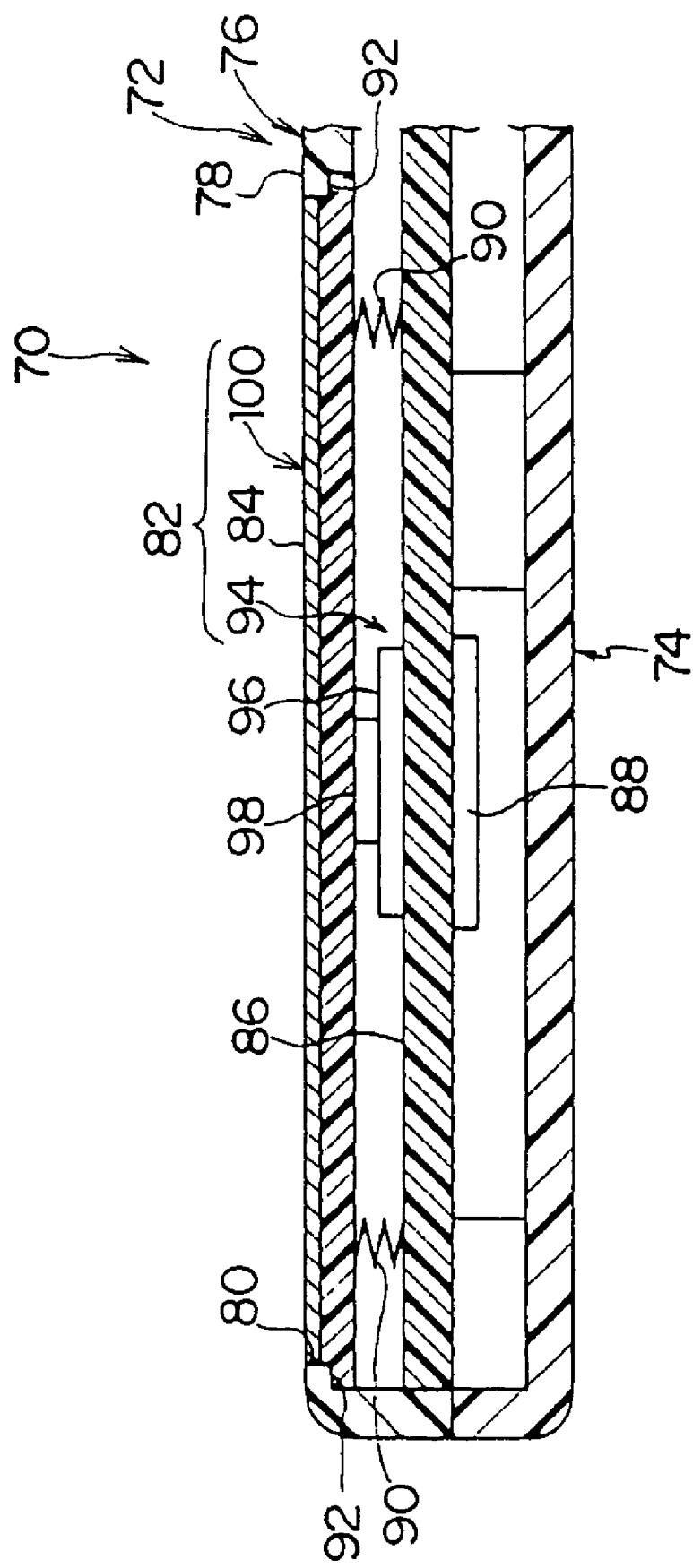
FIG. 3 is a sectional view along line 3—3 of FIG. 2.

A plan view of the controller 70 is shown in FIG. 2, and the structure of main portions of the controller 70 is shown by a sectional view in FIG. 3.

As shown in FIG. 2, the case 72 is structured by a lower case 74 and an upper case 76. The lower case 74 is formed substantially in the shape of a box which opens toward one side in the direction of thickness. In contrast, the upper case 76 is formed substantially in the shape of a box which opens toward the side opposite that of the lower case 74. The lower case 74 and the upper case 76 are integrally connected in a state in which the respective open ends thereof face one another.

Further, as shown in FIG. 2 and FIG. 3, a substantially rectangular opening portion 80 is formed in an upper floor portion 78 of the upper case 76. A panel 84 serving as an operation surface structuring a panel switch 82 serving as a detecting portion, is provided at the case 72 so as to correspond to the opening portion 80. The panel 84 is formed in a substantially rectangular flat plate shape whose outer peripheral configuration corresponds to the opening portion 80.

Moreover, as shown in FIG. 3, a substrate 86 is disposed substantially parallel beneath the panel 84 (at the lower case 74 side). Wiring, such as print wires or the like, is provided at at least either one of the obverse and the reverse surface of the substrate 86. Further, a CPU 88 and electrical parts, such as resistors and capacitors and the like, are electrically connected to the substrate 86 by the aforementioned wiring. Moreover, the substrate 88 is electrically connected to the CPU 16 of the aforementioned computer 12 via the aforementioned wiring or the like.

The substrate 86 is fixed to the upper case 76 or the lower case 74 either directly or indirectly by a holding means. Further, compression coil springs 90 are disposed on the substrate 86. The compression coil springs 90 support the panel 84 in a state of urging the panel 84 toward the opening portion 80 side, such that the panel 84 is able to approach and move away from the substrate 86.

Moreover, stoppers 92 are formed at the upper case 76. The stoppers 92 are engaged with the outer peripheral portion of the panel 84, and the panel 84 is held so as to not be separated from the substrate 86 by a predetermined distance or more.

Further, press switches 94, which serve as pressing force detecting means and which, together with the panel 84, structure the panel switch 82, are provided between the panel 84 and the substrate 86. The press switch 94 is equipped with a main body 96.

The main body 96 is equipped with a fixed contact. This fixed contact is electrically connected to the wiring of the substrate 86. Further, a movable portion 98 is provided at the main body 96. The movable portion 98 is movable with respect to the main body 96 in substantially the same directions as the directions in which the panel 84 approaches and moves away from the substrate 86. Therefore, at least one portion of the movable portion 98 moves into the main body 96 due to the movable portion 98 moving in the direction of approaching the substrate 86.

Further, a movable contact is provided at the movable portion 98. When the movable portion 98 is moved in the direction of approaching the substrate 86, the movable contact of the movable portion 98 contacts the fixed contact of the main body 96 and becomes continuous, and due to the movable portion 98 moving away from the substrate 86, the continuity with the fixed contact is cancelled.

Further, the side of the movable portion 98 opposite the main body 96 abuts the reverse surface of the panel 84. Accordingly, due to the panel 84 moving in the direction of approaching the substrate 86 against the urging force of the compression coil springs 90, the movable portion 98 approaches the substrate 86. The movable contact of the movable portion 98 thereby contacts the fixed contact of the main body 96.

Figure 4:
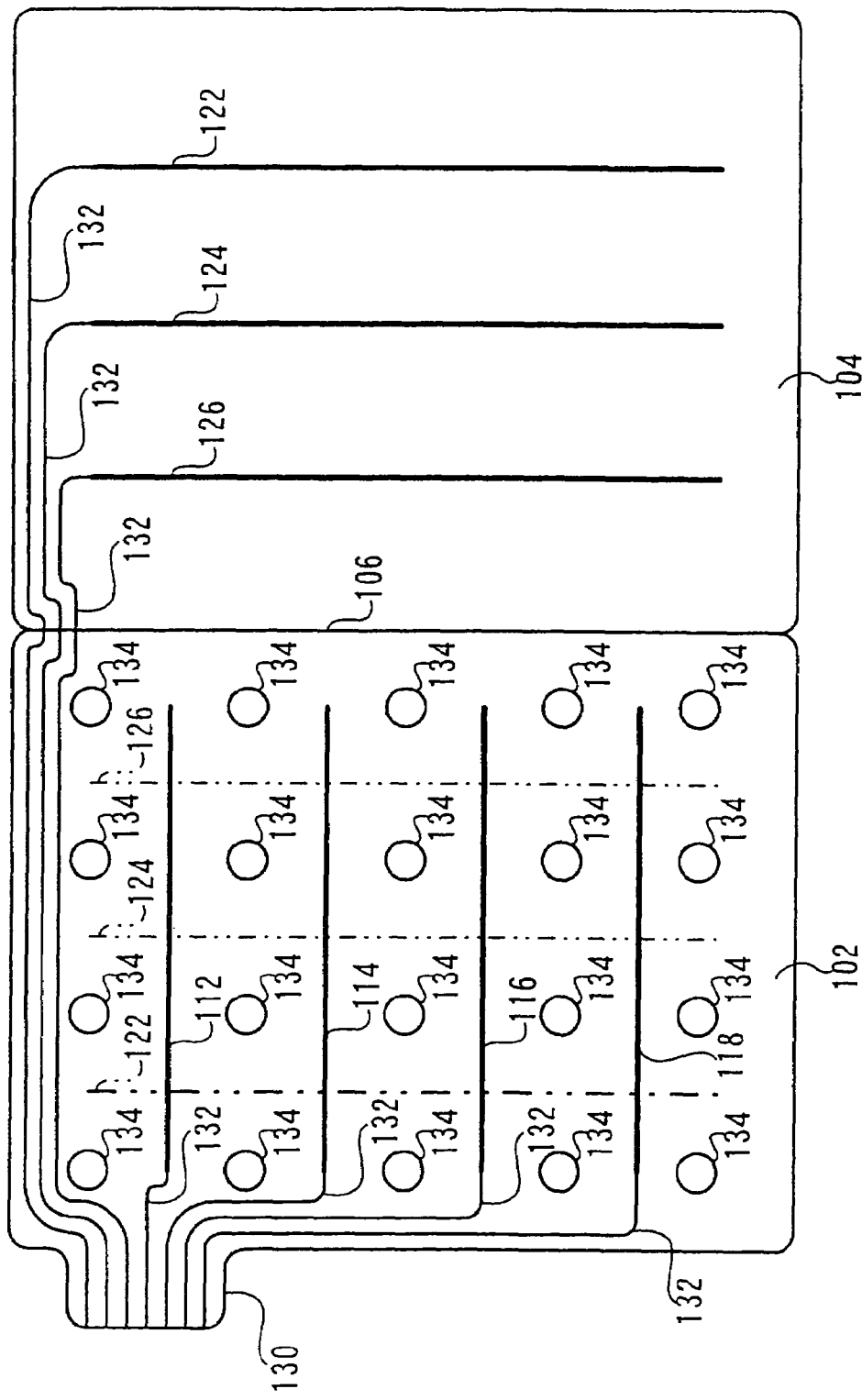
FIG. 4 is an unfolded view of a sheet switch.

On the other hand, as shown in FIG. 3, a sheet switch 100 is placed at the obverse side of the panel 84. Here, a plan view in a state in which the sheet switch 100 is unfolded is shown in FIG. 4. As shown in this drawing, the sheet switch 100 is equipped with a pair of base portions 102, 104.

The base portions 102, 104 are each formed, for example, in a sheet shape which is substantially rectangular as seen in plan view, from an insulating synthetic resin material. At least the base portion 104 is set to a rigidity of an extent such that the base portion 104 can be elastically deformed by pressing force of a predetermined magnitude or more (e.g., the extent of a person lightly pressing with his/her finger).

Further, the base portion 102 is connected, at the end portion thereof at one transverse direction side (the right side in FIG. 4) thereof, to the end portion at the other transverse direction side (the left side in FIG. 4) of the base portion 104. The base portion 102 can thereby rotate relative to the base portion 104, with a connecting portion 106 between the base portion 102 and the base portion 104 being the axis.

Further, a plurality (four in the present embodiment) of line terminals 112, 114, 116, 118 are formed on the obverse of the base portion 102. These line terminals 112-118 are shaped as wires or rods which are long along the transverse direction of the base portion 102. Further, the line terminals 112–118 are formed so as to parallel to one another at each predetermined interval along the longitudinal direction of the base portion 102.

On the hand, a plurality (three in the present embodiment) of line terminals 122, 124, 126 are formed on the obverse of the base portion 104. These line terminals 122–126 are shaped as wires or rods which are long along the longitudinal direction of the base portion 104. Further, these line terminals 122–126 are formed so as to parallel to one another at each predetermined interval along the transverse direction of the base portion 104.

A connector portion 130 is formed at the transverse direction other end portion of the base portion 102. At these connector portion 130, a plurality (seven in the present embodiment) of connecting wires 132 are formed in correspondence with the respective aforementioned line terminals 112–118. One end portions of the respective connecting wires 132 are electrically connected to ones of ends of the corresponding line terminals 112–126 via the base portion 102 and also the obverse of the base portion 104.

In contrast, the respective connecting wires 132 are electrically connected to print wires or the like of the substrate 86 shown in FIG. 3, via lead wires (not illustrated) of another connector portion which is mechanically connected to the connector portion 130. Moreover, the respective connecting wires 132 are electrically connected to the aforementioned CPU 88 via the print wires or the like of the substrate 86.

The base portion 102 and the base portion 104 are folded over at the connecting portion 106 such that the obverses thereof face one another. In this way, as shown by the two-dot chain lines on the base portion 102 in FIG. 4, the line terminals 122–126 are substantially orthogonal to the line terminals 112–118. Accordingly, the line terminals 112–126 are arranged in a lattice form on the whole. In this state, when one of the line terminals 112–118 and one of the line terminals 122–126 contact one another and become continuous, this continuity is detected by the CPU 88.

Further, as shown in FIG. 4, a plurality of projections 134 are formed on the obverse of the base portion 102. These projections 134 are formed so as to be positioned at the sides of the line terminals 122–126, at the sides of the line terminals 112–118 and in the state in which the line terminals 122–126 oppose the obverse of the base portion 102. In the state of being folded over around the connecting portion 106, the projections 134 hold the base portion 104 in a state in which the obverse of the base portion 104 is separated by a predetermined distance from the obverse of the base portion 102. Therefore, in the usual state, the line terminals 112–116 and the line terminals 122–126 are separated from one another.

<Operation and Effects of the Present Embodiment>

(Summary of Operation of Controller 70)

Next, the operation of the controller 70 will be described simply, before description of the overall operation and effects of the present embodiment.

In the present embodiment, when, for example, a touch portion 150 among touch portions 140, 142, 144, 146, 148, 150, 152, 154, 156, 158, 160, 162 on the sheet switch 100 which are in vicinities of the points of intersection of one of the line terminals 112–118 and one of the line terminals 122–126 as seen in a plan view of the controller 70 (i.e., in the state shown in FIG. 2), is touched and the sheet switch 100 is pressed, at the touch portion 150, the base portion 104 forming the sheet switch 100 elastically deforms. In this way, the line terminal 114 and the line terminal 126, whose point of intersection is in a vicinity of the touch portion 150, contact and become continuous. However, because the base portion 104 is supported by the projections 134 in vicinities of the touch portions 140–162 other than the touch portion 150, the line terminals 112–126 do not contact one another and become continuous.

The continuity (conduct signal) of the line terminal 114 and the line terminal 126 is detected by the CPU 88. The CPU 88, which has detected this continuity, outputs, to the CPU 16 of the computer 12, a touch signal X1 corresponding to the continuity of the line terminal 114 and the line terminal 126.

On the other hand, when pressing force exceeding the urging forces of the compression coil springs 90 is imparted to the panel 84 via the sheet switch 100 in a state in which an operator touches the reverse surface of the base portion 104 of the sheet switch 100 with his/her finger, the panel 84 moves toward the substrate 86. The movable contact of the movable portion 98 of the press switch 94 and the fixed contact of the main body 96 of the press switch 94 thereby contact one another and become continuous.

The continuity of the movable contact of the movable portion 98 and the fixed contact of the main body 96 is detected by the CPU 88 which is electrically connected to the fixed contact. When the CPU 88 detects the continuity of the movable contact of the movable portion 98 and the fixed contact of the main body 96, the CPU 88 outputs, to the CPU 16 of the computer 12, a click signal X2 based on the continuity signal of the movable contact of the movable portion 98 and the fixed contact of the main body 96.

(Operation and Effects at the time of Screen Switching)

Next, the operation and effects relating to screen switching at the present center control unit 10 will be described on the basis of the flowcharts in FIG. 7 through FIG. 10.

(Summary of Main Program)

Figure 7:
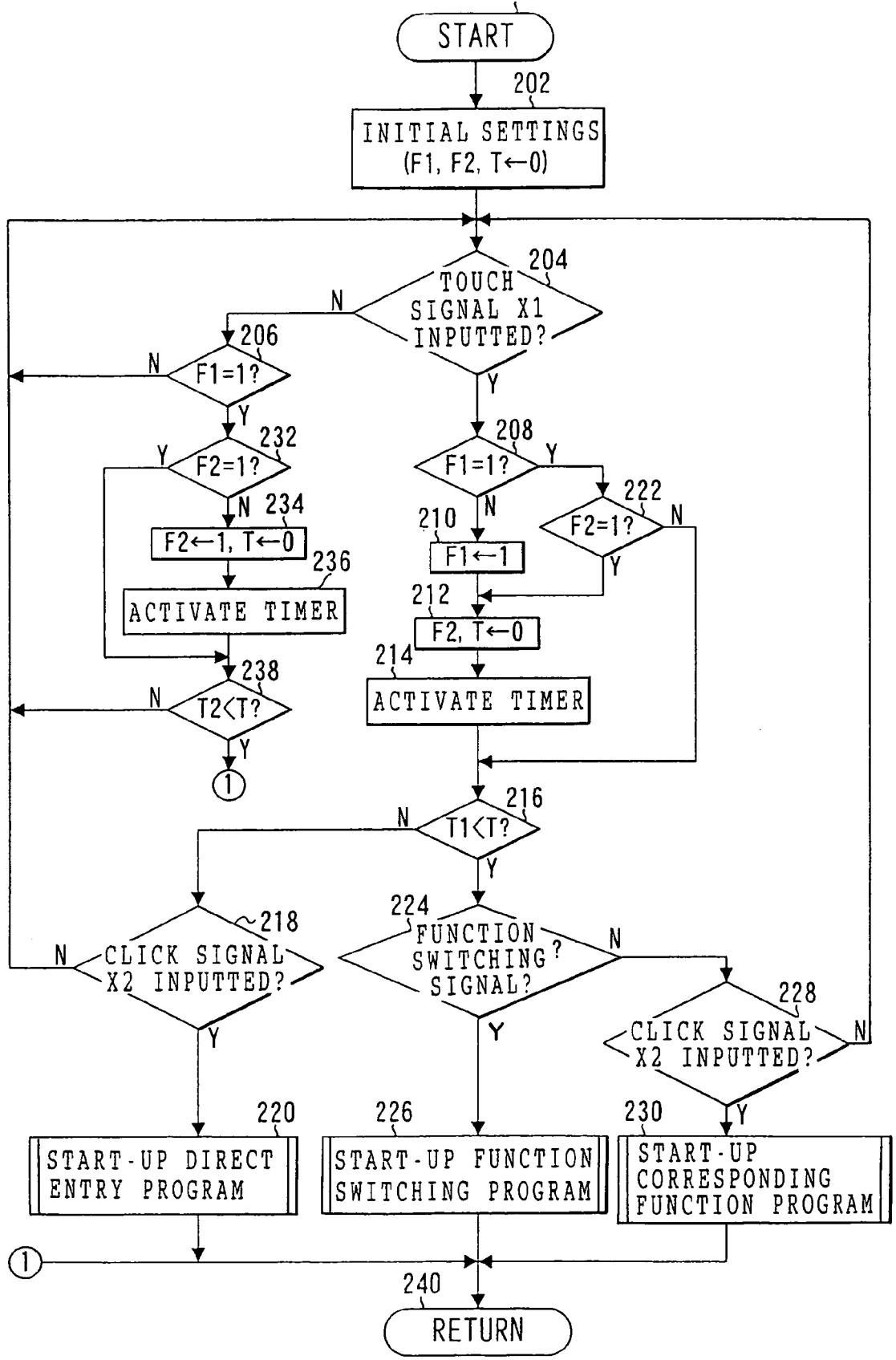
FIG. 7 is a flowchart showing a summary of a main program of the car-mounted device control system relating to the first embodiment of the present invention.

First, as shown in FIG. 7, in step 200, the CPU 16 of the computer 12 reads out and starts up the main program of the control program from the storage medium 24. When the main program is started up, initial setting processing is carried out in step 202.

In this initial setting processing, 0 is substituted in for flags F1, F2 such that the flags F1, F2 are reset. Further, in the initial setting processing, 0 is substituted in for elapsed time T in the timer 26 (including the timer program) such that the elapsed time T is reset.

Moreover, in this state, a car navigation program is executed in parallel. A map screen based on the car navigation program is thereby displayed on the monitor television 28. Further, the function switching buttons 64–68 based on the car navigation program are displayed on the monitor television 28 at positions corresponding to the touch portions 140–162 on the sheet switch 100.

Next, in step 204, it is judged whether or not the aforementioned touch signal X1 has been inputted from the CPU 88 of the controller 70. Here, for example, if the finger of the operator is not touching the aforementioned sheet switch 100 and therefore none of the line terminals 112–126 is continuous, the touch signal X1 is not outputted from the CPU 88. Furthermore, if the finger of the operator is not touching the sheet switch 100, pressing force is not imparted to the panel switch 84. Therefore, the fixed contact of the main body 96 of the press switch 94 and the movable contact of the movable portion 98 are not continuous. Accordingly, the click signal X2 is not outputted.

Accordingly, in this state, the touch signal X1 and the click signal X2 are not inputted to the CPU 16. Therefore, the routine proceeds to step 206. In step 206, it is judged whether or not 1 has been substituted in for the flag F1. However, if the car navigation program is immediately after having been started from step 200, the flag F1 is still in the state of being reset. Therefore, the routine returns to step 204, and, in a sense, a mere signal standby state arises.

In contrast, when, for example, the finger of the operator touches one of the touch portions 140–162, among the line terminals 112–118, 122–126, one of the line terminals 112–118 and one of the line terminals 122–126 corresponding to the touch portion 140–162 which the finger of the operator touched, become continuous. The touch signal X1, which corresponds to the line terminals 112–118, 122–126 which have become continuous, is thereby outputted from the CPU 88.

When it is judged in step 204 that the touch signal X1 which is outputted from the CPU 88 in this way has been inputted to the CPU 16, the routine proceeds to step 208. In step 208, it is judged whether or not 1 has been substituted in for the flag F1.

If this is the first time that the touch signal X1 is inputted to the CPU 16 from the time the car navigation program started in step 200, 1 was not substituted in for the flag F1 therebefore. Therefore, the routine proceeds to step 210 where 1 is substituted in for the flag F1.

Next, the routine proceeds to step 212 where the flag F2 and the elapsed time T of the timer 26 are respectively reset, and thereafter, in step 214, the timer 26 is activated.

Then, the routine proceeds to step 216, and it is judged whether or not the elapsed time has exceeded a set time T1 which was set in advance. Here, if the elapsed time T has not exceeded the set time T1, the routine proceeds to step 218. In step 218, it is judged whether or not the aforementioned click signal X2 has been inputted to the CPU 16.

If a finger has pressed the panel 84 within the set time T1 from the time a finger pressed the touch portion 140–162, the click signal X2 has been inputted to the CPU 16 within the set time T1. A direct entry program which will be described later is thereby started up in step 220.

In contrast, if it is judged in step 218 that the click signal X2 has not been inputted to the CPU 16, the routine returns to step 204 and further proceeds to step 208.

In this state, because 1 has been substituted in for the flag F1, the routine proceeds from step 208 to step 222. In step 222, it is judged whether or not 1 has been substituted in for the flag F2, but in this state, the flag F2 is in a 0 state. Therefore, the routine proceeds to step 216 where it is judged whether or not the elapsed time T of the timer 26 has exceeded the set time.

When the touch signal X1 continues to be outputted from the CPU 88 up until the set time T1 is exceeded, the routine proceeds from step 216 to step 224. In step 224, it is judged whether or not the touch signal X1, which had been inputted until now, is a function switching signal corresponding to the aforementioned function switching buttons 64–68. Moreover, when it is judged in step 224 that the touch signal X1 is a function switching signal, the routine proceeds to step 226, and a function switching program which will be described later is started up.

On the other hand, when it is judged in step 224 that the touch signal X1 is not a function switching signal, the routine proceeds to step 228. In step 228, it is judged whether or not the click signal X2 is inputted to the CPU 16.

When the panel 84 is pressed after the aforementioned elapsed time T has exceeded the set time T1 and the click signal X2 is thereby inputted to the CPU 16, the routine proceeds from step 228 to step 230, and a corresponding function processing program, which will be described later, is started up.

In contrast, when it is judged in step 228 that the click signal X2 has not been inputted to the CPU 16, the routine again returns to step 224, and the above-described steps are circled through until the click signal X2 is inputted to the CPU 16.

However, in this state, in a case in which the finger of the operator has moved away from the sheet switch 100 or the like, the touch signal X1 outputted from the CPU 88 is ceased. In this case, the routine proceeds from step 204 to step 206.

In this state, because 1 has already been substituted in for the flag F1, the routine proceeds to step 232. Next, in step 232, it is judged whether or not 1 has been substituted in for the flag F2. In this state, 1 has not yet been substituted in for the flag F2. Therefore, in step 234, 1 is substituted in for the flag F2. Moreover, in step 234, the elapsed time T of the timer 26 is reset. Next, in step 236, the timer 26 is again activated.

Next, the routine proceeds to step 238, and it is judged whether or not the elapsed time T of the timer 26 has exceeded a set time T2 which was set in advance. If it is immediately after the activation of the timer 26 or the like and the elapsed time T of the timer has not exceeded the set time T2, the routine returns to step 204.

On the other hand, when the touch signal X1 has ceased by the time the set time T2 has been exceeded, the routine proceeds from step 238 to step 240, and again returns to step 200.

In contrast, when the touch signal X1 is again inputted to the CPU 16 before the elapsed time T exceeds the set time T2, the routine proceeds to step 222 via step 208. In this state, because 1 is substituted in for the flag F2 in step 234, in step 212, the flag F2 and the elapsed time T of the timer 26 are reset.

(Summary of Direct Entry Program)

In step 218 of the above-described main program, when the click signal X2 is inputted to the CPU 16 before the elapsed time T of the timer 26 exceeds the set time T1, the routine proceeds to step 220. In step 220, the direct entry program is read from the storage medium 24 and executed.

Figure 8:
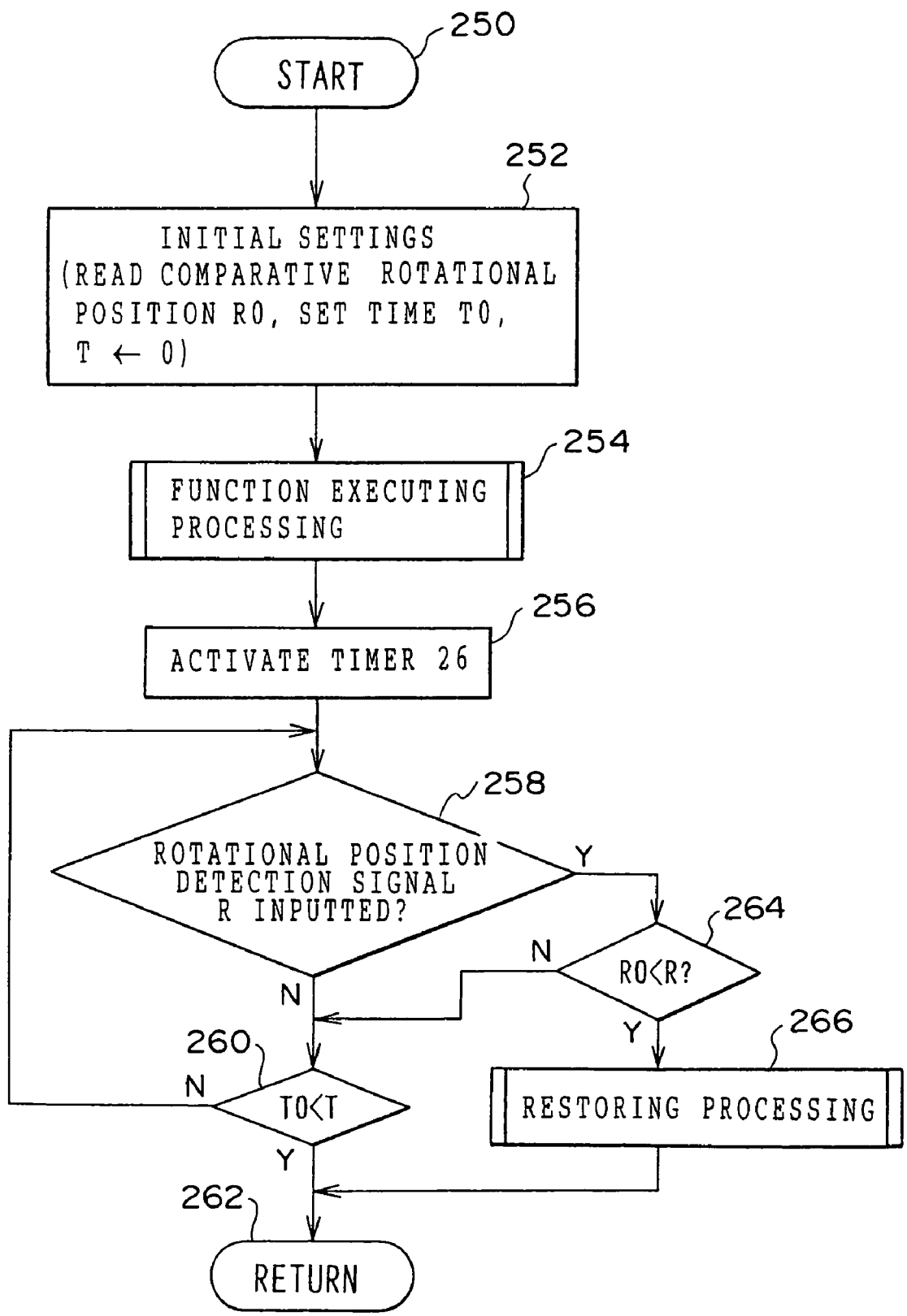
FIG. 8 is a flowchart showing a summary of a subroutine of the car-mounted device control system relating to the first embodiment of the present invention.

As shown in the flowchart of FIG. 8, in step 250, when the direct entry program is started up, initial setting is carried out in step 252. In this initial setting, a comparative rotational position R0 and a set time T0 are read from the storage medium 24. Further, in this initial setting, the elapsed time T of the timer 26 is reset. Next, in step 254, although not displayed on the screen 30 of the monitor television 28, among the respective functions allotted in advance to the respective touch portions 140–162 (i.e., the functions corresponding to the characters shown in FIG. 2), the function which corresponds to the touch portion 140-162 which a finger touched is executed.

Next, in step 256, the timer 26 is again activated. Moreover, in step 258, it is judged whether or not a rotational position detection signal R from the steering angle sensor 18 has been inputted to the CPU 16. In this state, if the rotational position detection signal R has not been inputted to the CPU 16, the routine proceeds to step 260. In step 260, it is judged whether or not the elapsed time T of the timer 26 has exceeded the set time T0.

If the rotational position detection signal R has not been inputted to the CPU 16 during the period of time from this state to the time when the elapsed time T exceeds the set time T0, the routine returns from step 262 to the main program, and proceeds to step 240 of the main program. Accordingly, in this case, execution of the function corresponding to the touch portion 140–162 which the finger touched is maintained.

On the other hand, when it is judged in step 258 that the rotational position detection signal R has been inputted to the CPU 16, the routine proceeds to step 264. In step 264, the rotational position detection signal R and the comparative rotational position R0 are compared. If it is judged in step 264 that the rotational position detection signal R does not exceed the comparative rotational position R0, the routine moves on to step 260.

In contrast, when it is judged in step 264 that the rotational position detection signal R has exceeded the comparative rotational position R0, restoring processing is carried out in step 266. In this restoring processing, the aforementioned function corresponding to the touch portion 140–162 which the finger touched is cancelled, and the state is returned to the state before execution of that function. Next, after the routine proceeds to step 262, the routine returns to the main program and returns from step 240 to step 200.

In this way, in the present embodiment, even if the direct entry program is started up and execution of the function corresponding to the touch portion 140–162 which the finger touched is maintained, in a case in which the steering wheel 22 rotates, that function is cancelled (i.e., substantially, the touch signal X1 and the click signal X2 are nullified). In this way, during the rotation-operation of the steering wheel 22, even if a finger or the like mistakenly touches the touch portion 140–162 and also presses it, the state and the like of the screen 30 of the monitor television 28 can be returned to the original state.

Further, the function which is executed in the above-described direct entry program requires relatively immediate pressing of the panel 84 after the finger has touched the touch portion 140–162. Accordingly, it can be thought to allocate the functions whose frequency of use is relatively high and, further, for which immediate execution thereof is desired. Here, as described above, after the initial setting in step 252, that function is executed in step 254. In this way, it is possible to prevent the operator from experience a sense of a timewise delay during usual operation.

(Summary of Function Switching Program)

On the other hand, in step 224 of the above-described main program, in a case in which the touch signal X1 inputted to the CPU 16 is a function switching signal, i.e., a signal corresponding to one of the function switching buttons 64–68 displayed on the screen 30 of the monitor television 28 among the plural touch portions 140–162, the routine proceeds to step 226. In step 226, a function switching program is read from the storage medium 24 and is executed.

As shown in the flowchart in FIG. 20, when the function switching program is started up in step 270, initial setting is carried out in step 272. In this initial setting, the comparative rotational position R0 is read from the storage medium 24.

Next, in step 274, it is judged whether or not the rotational position detection signal R from a steering angle sensor 32 has been inputted to the computer 24. When it is judged in step 274 that the rotational position detection signal R has not been inputted to the CPU 16, the routine proceeds to step 276. In step 276, function switching executing processing is carried out. The function corresponding to the corresponding function switching button 64–68 is thereby switched to. For example, if a finger is touched the touch portion 140–162, the navigation program which has been executed in parallel up until now is ended. Moreover, the function of the function switching button 64–68 corresponding to this touch portion 140–162, i.e., a program for air conditioning operation, is executed. Thereafter, the routine returns from step 278 to the main program, and returns from step 240 to step 200.

On the other hand, when it is judged in step 274 that the rotational position detection signal R has been inputted to the CPU 16, the routine proceeds to step 280. In step 280, the rotational position detection signal R and the comparative rotational position R0 are compared. If it is judged in step 280 that the rotational position detection signal R has not exceeded the comparative rotational position R0, the routine proceeds to step 276.

In contrast, if it is judged in step 280 that the rotational position detection signal R has exceeded the comparative rotational position R0, the routine proceeds to step 282. In step 282, the inputted touch signal X1 and click signal X2 are cancelled (nullified). Therefore, the function corresponding to the function switching button 64–68 is not switched to.

Thereafter, the routine returns to the main program from step 278, and proceeds to step 240 of the main program.

In this way, in the present embodiment, at the time of usual operation (i.e., in the state in which the steering wheel 22 is not being rotation-operated), due to a portion corresponding to the function switching button 64–68 among the plural touch portions 140-162 being touched, no menu screen or the like for selecting respective functions is displayed, and the function can immediately proceed from the function used until then (e.g., the navigation function) to another function (e.g., the air conditioning operation function).

Moreover, when the rotation-operation of the steering wheel 22 is being carried out, when a portion corresponding to the function switching button 64–68 among the plural touch portions 140–162 is touched, the touch signal X1 and the click signal X2 are cancelled as described above. Therefore, even if, during the rotation-operation of the steering wheel 22, a portion corresponding to the function switching button 64–68 among the plural touch portions 140–162 is mistakenly touched, there is no mistaken proceeding from the function used until then (e.g., the navigation function) to another function (e.g., the air conditioning operation function).

(Summary of Corresponding Function Program)

On the other hand, in step 224 of the above-described main program, when it is judged that the touch signal X1 inputted to the CPU 16 is not a function switching signal, i.e., is a signal corresponding to one of selection buttons 40–62 (except for the selection buttons 40, 48, 56 in the state shown in FIG. 5) displayed on the screen 30 of the monitor television 28 among the plural touch portions 140–162, the routine proceeds to step 228. Further, when it is judged in step 228 that the click signal X2 has been inputted to the CPU 16, in step 230, the corresponding function program is read from the storage medium 24 and is executed.

Figure 10:
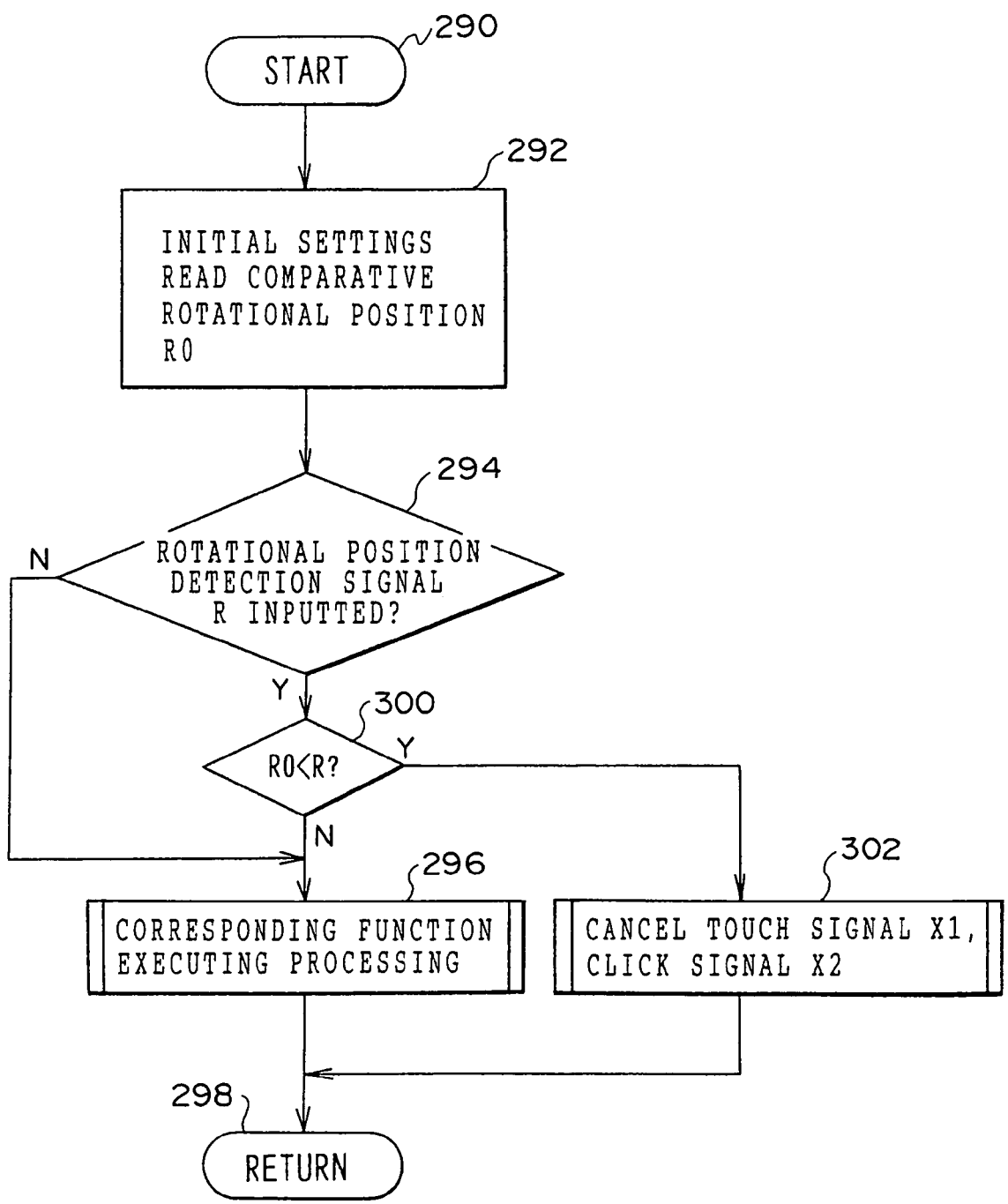
FIG. 10 is a flowchart showing a summary of another subroutine of the car-mounted device control system relating to the first embodiment of the present invention.

As shown in the flowchart in FIG. 10, when the corresponding function program is started up in step 290, initial setting is carried out in step 292. In this initial setting, the comparative rotational position R0 is read from the storage medium 24.

Next, in step 294, it is judged whether or not the rotational position detection signal R from the steering angle sensor 32 has been inputted to the computer 24. When it is judged in step 294 that the rotational position detection signal R has not been inputted to the CPU 16, the routine proceeds to step 296. In step 296, corresponding function executing processing is carried out. In this corresponding function executing processing, processing of the function corresponding to the corresponding selection button 40–62 is carried out. Thereafter, the routine returns from step 298 to the main program, and returns from step 240 to step 200.

On the other hand, when it is judged in step 294 that the rotational position detection signal R has been inputted to the CPU 16, the routine proceeds to step 300. In step 300, the rotational position detection signal R and the comparative rotational position R0 are compared. If it is judged in step 300 that the rotational position detection signal R does not exceed the comparative rotational position R0, the routine proceeds to step 296.

In contrast, if it is judged in step 300 that the rotational position detection signal R exceeds the comparative rotational position R0, the routine proceeds to step 302. In step 302, the inputted touch signal X1 and click signal X2 are cancelled (nullified). In this way, the processing of the function corresponding to the selection button 40–62 is not carried out.

Thereafter, the routine returns from step 298 to the main program, and proceeds to step 240 of the main program.

In this way, in the present embodiment, when rotation-operation of the steering wheel 22 is being carried out, in a case in which a portion corresponding to the selection button 40–62 among the plural touch portions 140–162 is touched, the touch signal X1 and the click signal X2 are cancelled as described above.

Therefore, even if, during the rotation-operation of the steering wheel 22, a portion corresponding to the function selection button 40–62 among the plural touch portions 140–162 is mistakenly touched, the processing of that function is not mistakenly carried out.

Note that the present embodiment is structured such that the absolute values of the comparative rotational position R0 and the rotational position detection signal R are compared. However, a structure is possible in which the comparative rotational position R0 is set to two types which are +R0 corresponding to rotation-operation of the steering wheel 22 in the direction of arrow A1 in FIG. 1 and −R0 corresponding to rotation-operation of the steering wheel 22 in the direction of arrow A2 in FIG. 1 which is opposite thereto, and, for the rotational position detection signal R as well, the signal in the direction of arrow A1 in FIG. 1 is +R and the signal in the direction of arrow A2 which is opposite thereto is −R, and when the rotational position detection signal +R is inputted to the computer 24, it is compared with the comparative rotational position +R0 (whether or not R0 <R), and when the rotational position detection signal −R is inputted to the computer 24, it is compared with the comparative rotational position −R0 (whether or not −R<−R0).

Further, a structure is possible in which, with a touch signal corresponding to the direction of arrow A1 in FIG. 1 being +X1 and a touch signal corresponding to the direction of arrow A2 in FIG. 1, which is opposite thereto, being −X1, for example, when the touch signal +X1 and the rotational position detection signal +R are inputted to the CPU 16, or when the touch signal −X1 and the rotational position detection signal −R are inputted to the CPU 16, basically, the CPU 16 does not unconditionally cancel the touch signal X1 or −X1, and when an operation signal +X and the rotational position detection signal −R are inputted to the CPU 16, or when an operation signal −X and the rotational position detection signal +R are inputted to the CPU 16, the rotational position detection signal +R or the rotational position detection signal −R and the comparative rotational position −R0 or the comparative rotational position +R0 are compared.

<Second Embodiment>

Next, another embodiment of the present invention will be described. In describing the respective embodiments hereinafter, regions which are basically the same as those of the embodiments preceding the embodiment being explained including the above-described first embodiment, will be denoted by the same reference numerals and description thereof will be omitted. Further, similarly, with respect to the processings of the respective steps of the flowcharts of the respective drawings used in explaining the respective embodiments hereinafter, processings which are basically the same as the processing contents in the flowcharts used in the embodiments preceding the embodiment being explained including the flowchart of FIG. 2, will be denoted by the same step numbers, and detailed description thereof will be omitted.

Figure 11:
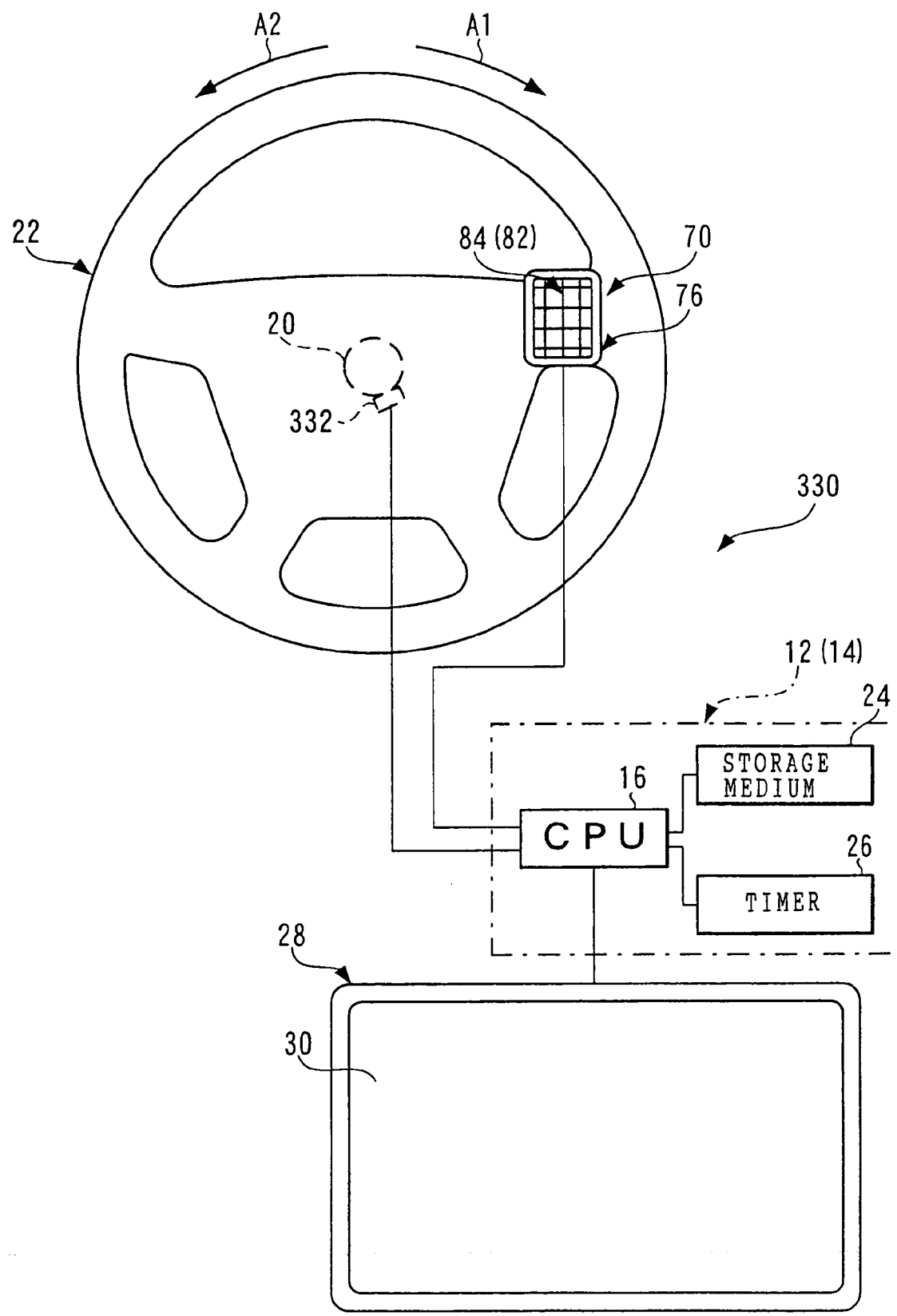
FIG. 11 is a composite diagram of a plan view and a block diagram showing a summary of the structure of a car-mounted device to which is applied a car-mounted device control system relating to a second embodiment of the present invention.

The summary of the structure of a center control unit 330, which serves as a car-mounted device to which is applied a car-mounted device control system relating to a second embodiment of the present invention, is shown in a block diagram in FIG. 11.

As is shown in this figure, the present center control unit 330 is not equipped with the steering angle sensor 18 which was explained in the above-described first embodiment, and instead, is equipped with a rotational speed sensor 332. The rotational speed sensor 332 is provided in a vicinity of the steering shaft 20. The rotational speed sensor 332 detects the rotational speed (e.g., the angular speed) of the steering shaft 20 at the time when the steering shaft 20 rotates. On the basis of the detected rotational speed of the steering shaft 20, the rotational speed sensor 332 detects the rotational speed of the steering wheel 22. The rotational speed sensor 332 outputs an electrical speed detection signal (voltage or the like) corresponding to the detected rotational speed of the steering shaft 20. The speed detection signal outputted from the rotational speed sensor 332 is inputted to the CPU 16.

Further, in the above-described first embodiment, the comparative rotational position R0 is stored in advance in the storage medium 24. However, in the present embodiment, instead of the comparative rotational position R0, a comparative rotational speed V0 is stored in advance.

(Operation and Effects at the Time of Screen Switching)

Next, the operation and effects relating to screen switching at the present center control unit 330 will be described on the basis of the flowcharts in FIG. 12 through FIG. 14. Note that, because the main program is the same as the flowchart of FIG. 7 used in the above-described first embodiment, description thereof will be omitted.

Figure 12:
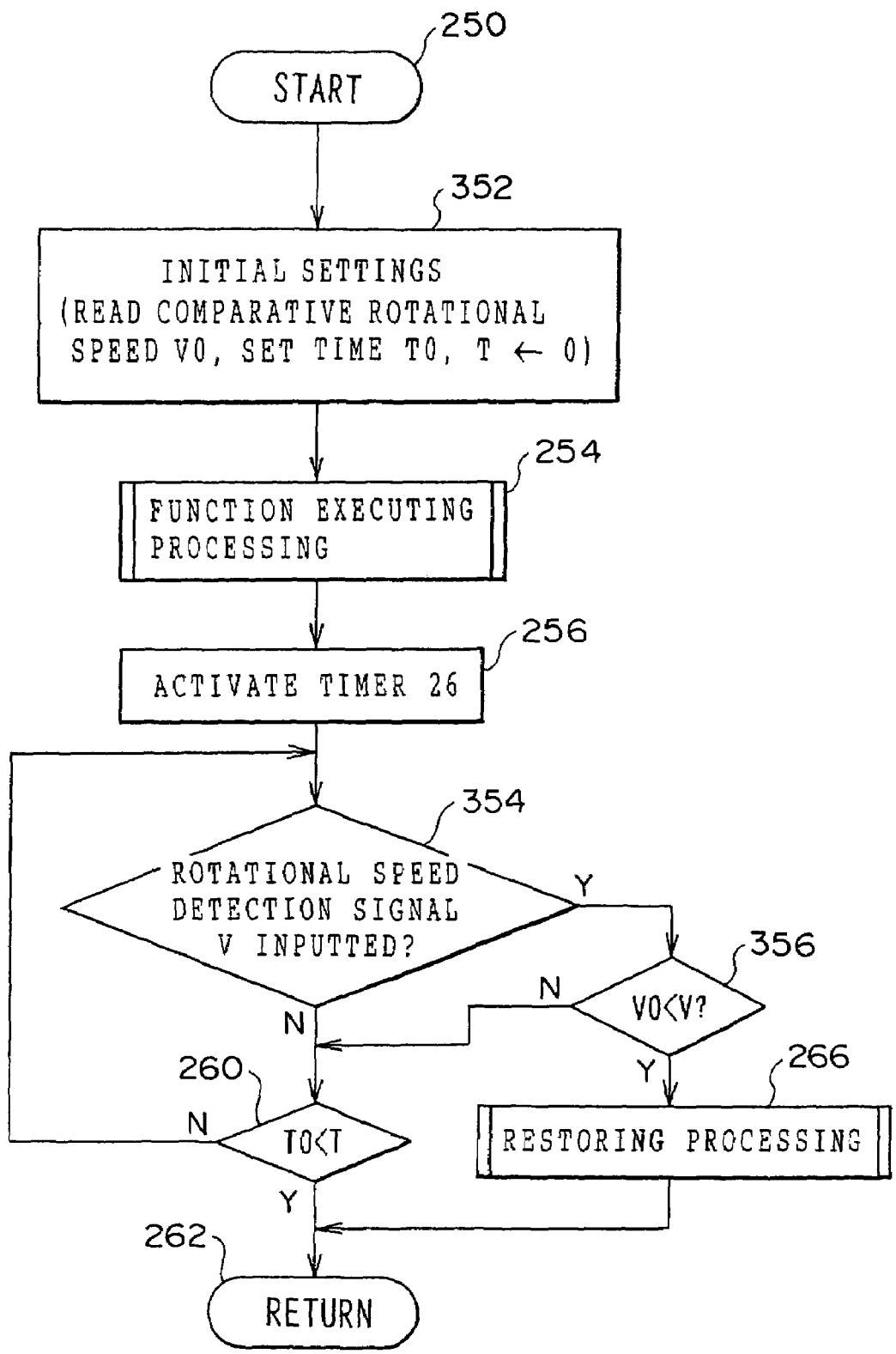
FIG. 12 is a flowchart showing a summary of a subroutine of the car-mounted device control system relating to the second embodiment of the present invention.
Figure 13:
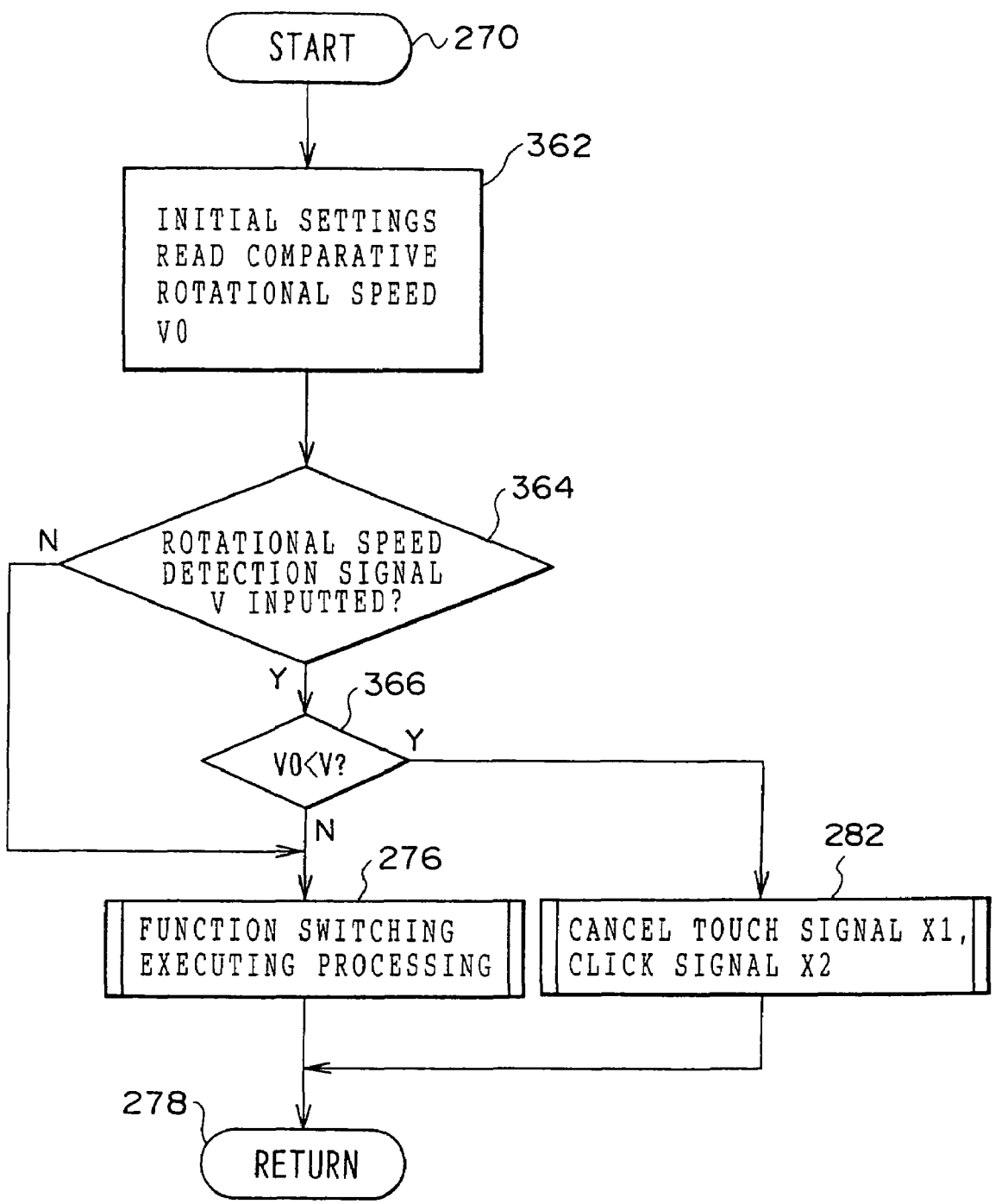
FIG. 13 is a flowchart showing a summary of another subroutine of the car-mounted device control system relating to the second embodiment of the present invention.
Figure 14:
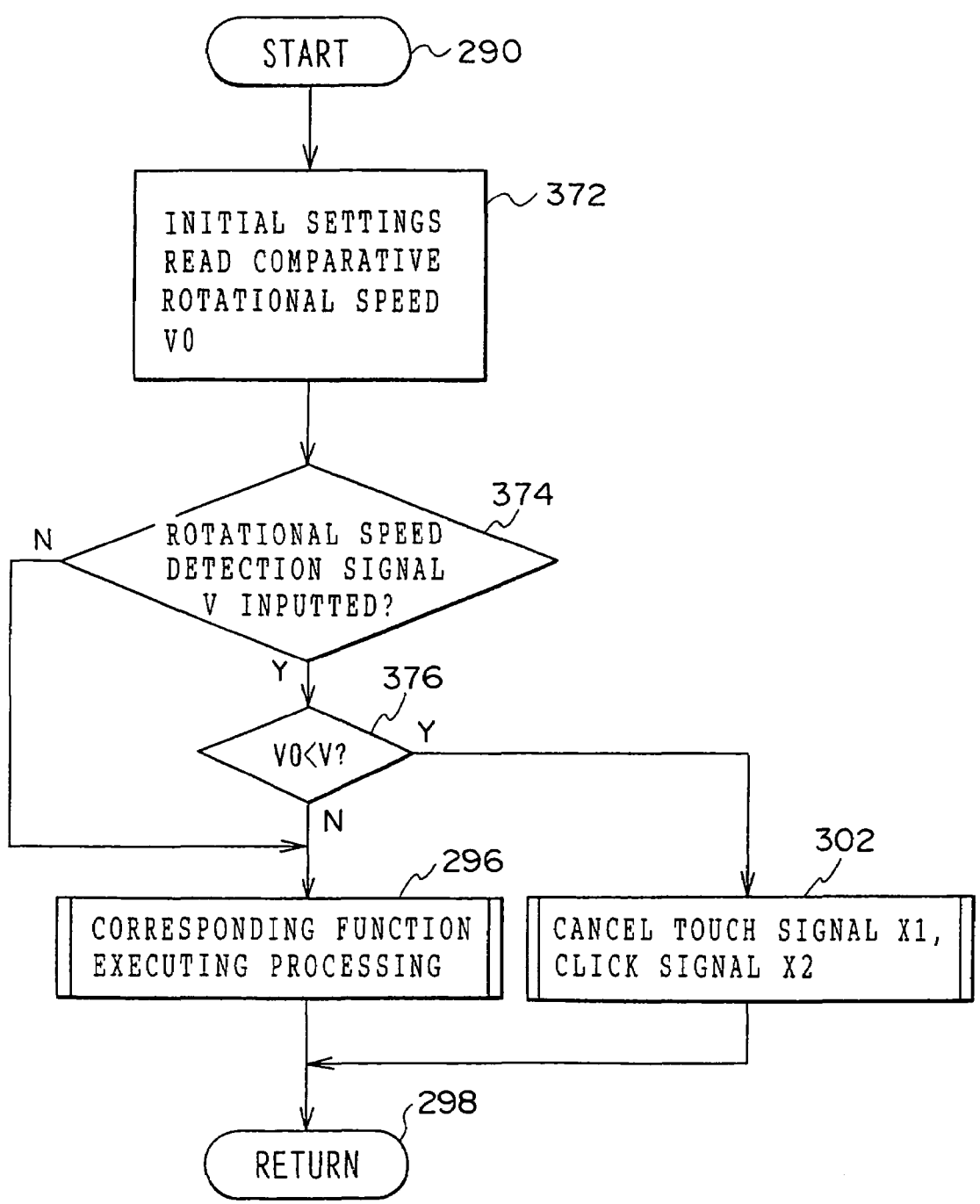
FIG. 14 is a flowchart showing a summary of another subroutine of the car-mounted device control system relating to the embodiment of the present invention.

As shown in FIG. 12 through FIG. 14, each of the direct entry program, the function switching program, and the corresponding function program are basically the same as in the above-described first embodiment. However, in the present embodiment, in the initial settings in the respective programs (steps 352, 362, 372), the comparative rotational position R0 is not read, and instead, the comparative rotational speed V0 is read. Further, in step 354 in the direct entry program of FIG. 12, step 364 in the function switching program of FIG. 13, and step 374 in the corresponding function program of FIG. 14, it is judged whether or not a rotational speed detection signal V from the rotational speed sensor 332 has been inputted to the computer 24. Moreover, in step 356 of FIG. 12, step 366 of FIG. 13, and step 376 of FIG. 14, the comparative rotational speed V0 and the rotational speed based on the inputted rotational speed detection signal V are compared.

Namely, differently from the above-described first embodiment, in the present embodiment, in a state, such as a so-called "sudden turn" or the like, which is faster than a predetermined rotational speed (i.e., the comparative rotational speed V0) and in which operations other than the rotation-operation of the steering wheel 22 cannot be carried out, even if, as the steering wheel 22 is rotated, the palm or the like of the vehicle occupant touches the controller 70 and the controller 70 is inadvertently operated, processing such as the screen being switched or the like is not carried out.

Further, even during the rotation-operation of the steering wheel 22, when there is rotation-operation which is slow to the extent that it does not interfere with operation of the controller 70, i.e., when the rotational speed V is smaller than the comparative rotational speed V0, the respective types of operations by the controller 70 are not cancelled. Therefore, an intentional operation such as screen switching or the like during rotation-operation of the steering wheel 22 is not cancelled, and it is possible to prevent the vehicle occupant from experiencing an unpleasant sensation.

Note that, the present embodiment is structured such that, as described above, the execution of restoring processing and the canceling of the touch signal X1 and the click signal X2 are carried out on the basis of the rotational speed signal V from the rotational speed sensor 332. However, for example, a structure is possible in which the steering angle sensor 18 also is used, and the execution of restoring processing and the canceling of the touch signal X1 and the click signal X2 are carried out on the basis of both the rotational position detection signal R and the rotational speed signal V.

<Third Embodiment>

Figure 15:
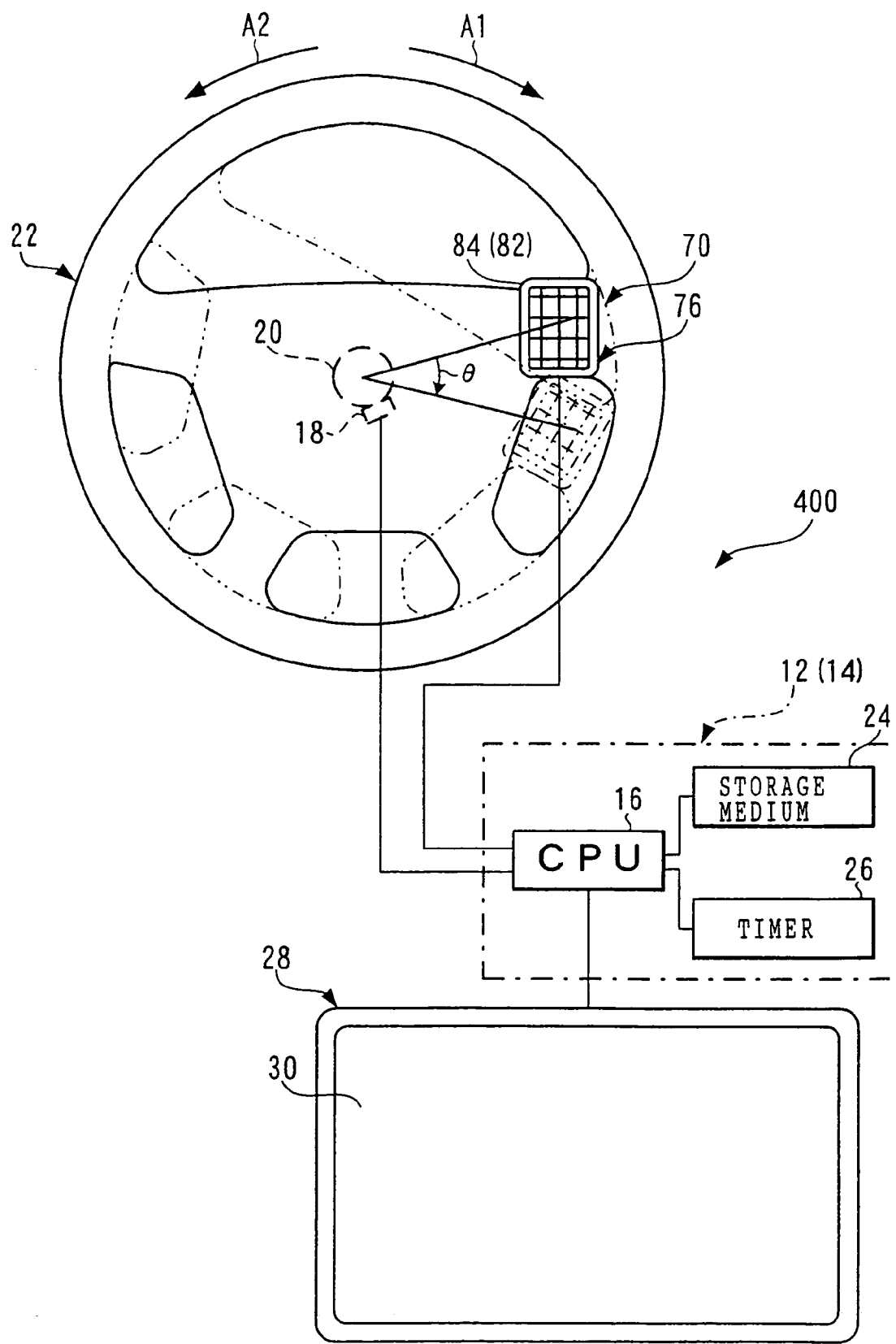
FIG. 15 is a composite diagram of a plan view and a block diagram showing a summary of the structure of a car-mounted device to which is applied a car-mounted device control system relating to a third embodiment of the present invention.

A summary of the structure of a center control unit 400, which serves as a car-mounted device to which is applied a car-mounted device control system relating to a third embodiment of the present invention, is shown by a block diagram in FIG. 15.

As shown in this figure, the present center control unit 400 has basically the same structure as the above-described first embodiment. However, differently from the above-described first embodiment, in the present center control unit 400, a correction program is stored in the storage medium 24.

<Operation and Effects of Present Embodiment>

Next, the operation and effects of the present embodiment will be described on the basis of a schematic flowchart of a screen scrolling program shown in FIG. 16, among the illustrated car navigation functions.

Figure 9:
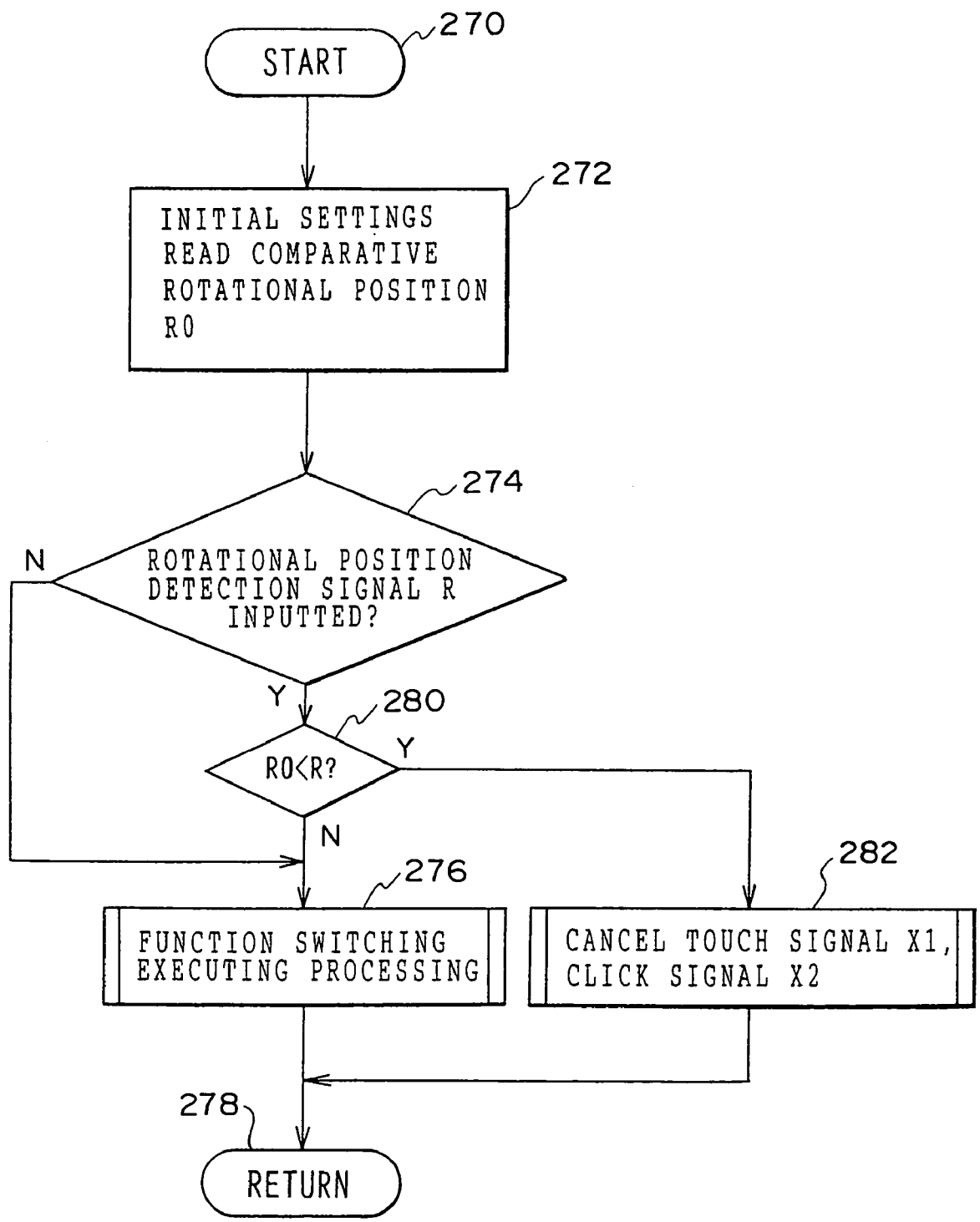
FIG. 9 is a flowchart showing a summary of another subroutine of the car-mounted device control system relating to the first embodiment of the present invention.
Figure 17:
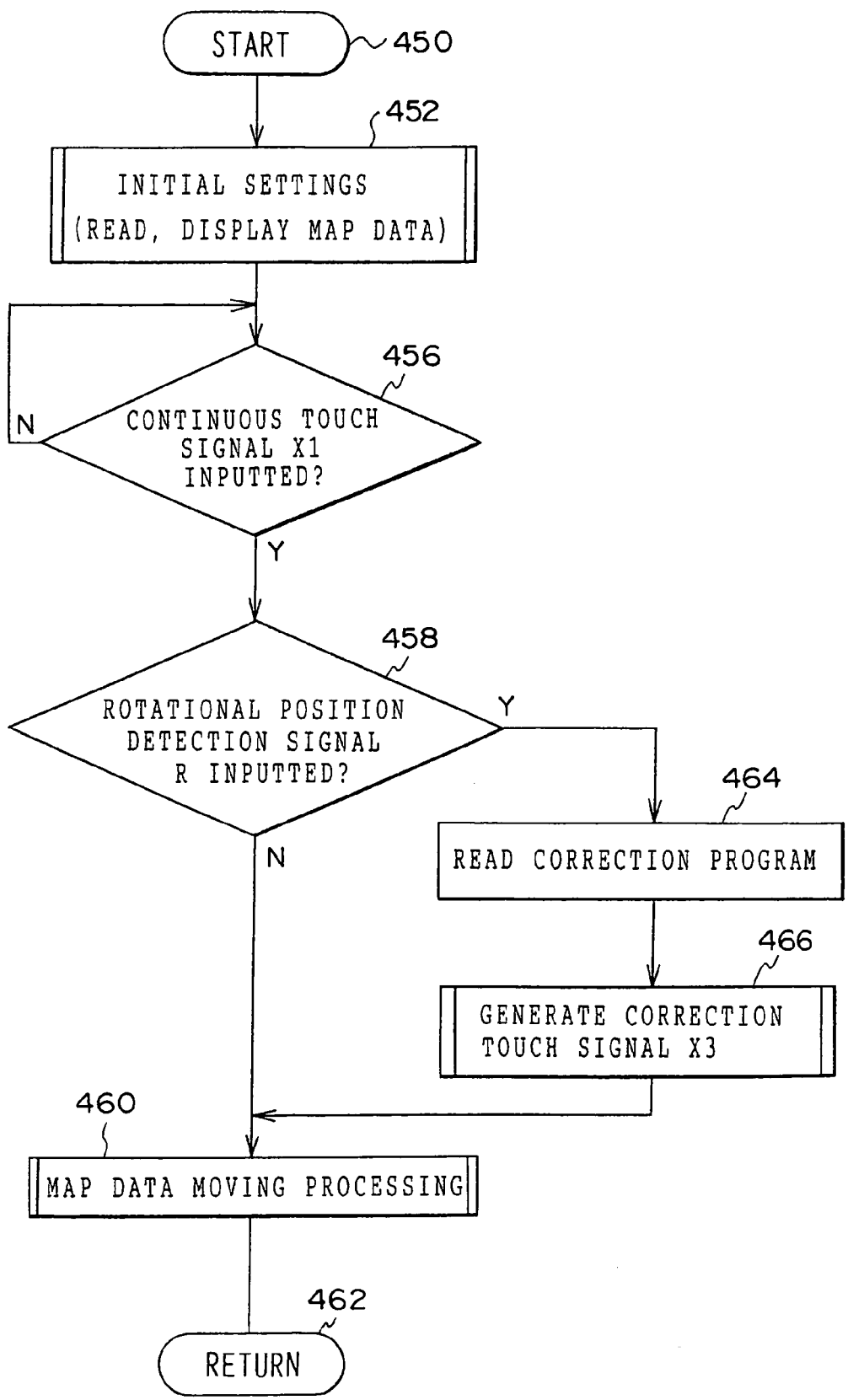
FIG. 17 is a flowchart showing a summary of a scrolling program of the car-mounted device control system relating to the third embodiment of the present invention.

The screen scrolling program shown in FIG. 17 is read from the storage medium 24 and is executed due to, for example, the function switching program being started up in step 226 of the flowchart of the main program shown in FIG. 7, and further, the function switching executing processing being carried out in step 276 of FIG. 9.

When the screen scrolling program is executed in step 450, first, initial setting is carried out in step 452. In this initial setting, the CPU 16 reads map data from the storage medium 24, and, for example, displays on the screen 30 the map data which is within the range of the screen 30 of the monitor television 28, among the map data of the vicinity of the current position (for an example, refer to FIG. 5).

Next, in step 454, it is judged whether or not a continuous touch signal X1, i.e., a plurality of touch signals X1 whose positions are changed within a predetermined time, has been inputted to the CPU 16. In this state, for example, when the touch signal X1 is not inputted at all or when the position does not change within a predetermined time even though the touch signal X1 is being inputted, the routine returns to step 454.

In contrast, when a finger or the like moves on the sheet switch 100 as is in a state in which the finger or the like touches the sheet switch 100, a plurality of the touch signals X1, whose positions differ within an extremely short period of time, are inputted in order. When it is judged in step 454 that such a continuous touch signal X1 has been inputted, in step 456, it is judged whether or not the rotational position detection signal R has been inputted to the CPU 16.

When it is judged in step 456 that the rotational position detection signal R has not been inputted, in step 458, moving processing of the map data is carried out. In this map data moving processing, first, on the basis of the inputted continuous touch signal X1, the moving direction of the finger on the sheet switch 100 is computed. Next, on the basis of the results of computation, the map data is moved in the direction opposite the moving direction of the finger. In this way, the map data which has moved to outside of the range of the screen 30 is eliminated from the screen 30, and the map data which has newly moved into the range of the screen 30 is displayed on the screen 30. After the movement and display of the map data has been completed, the routine proceeds to step 460, and returns to step 450.

Namely, when a finger is moved upward on the sheet switch 100, the map data moves downward, and when a finger is moved downward on the sheet switch 100, the map data moves upward. Further, when a finger is moved toward the left on the sheet switch 100, the map data moves toward the right, and when a finger is moved toward the right on the sheet switch 100, the map data moves toward the left. In this way, it appears as if the screen 30 has moved in the direction of movement of the finger. By appropriately moving the finger on the sheet switch 100, the map data at the side in the direction of movement can be displayed on the screen 30.

When it is judged in step 466 that the rotational position detection signal R from the steering angle sensor 32 has been inputted to the CPU 16, the routine proceeds to step 462. In step 462, the CPU 16 reads a correction program from the storage medium 24. In step 464, the CPU 16 which has read the correction program generates a correction touch signal X3 on the basis of the continuous touch signal X1 and the rotational position detection signal R.

Figure 16:
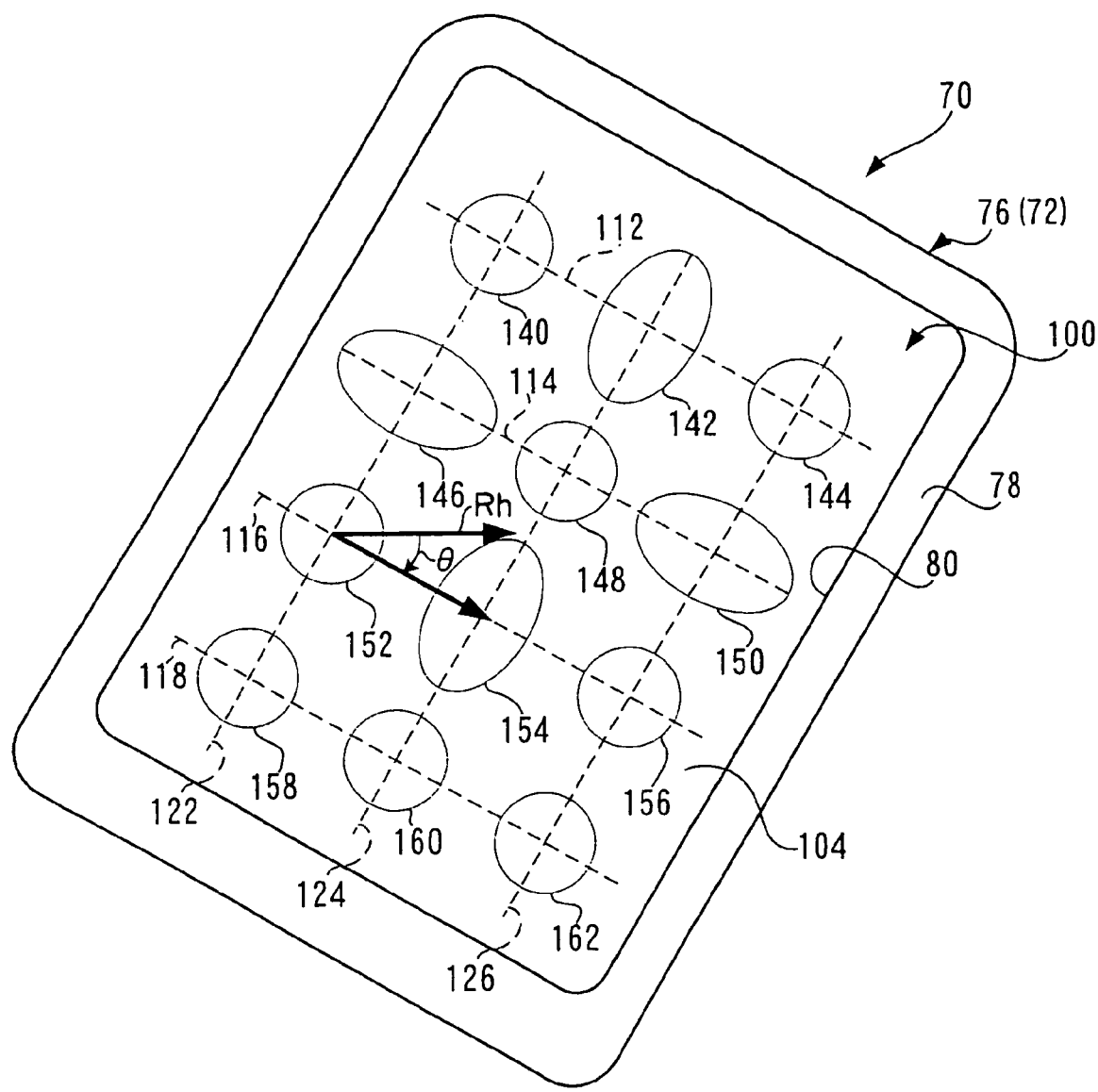
FIG. 16 is an enlarged view of an operating means, showing a state in which the operating means is rotated.

Namely, as shown in FIG. 16, when the steering wheel 22 rotates, the controller 70 rotates integrally, and the controller 70 tilts by a rotational angle θ of the steering wheel 22. In this state, for example, when the vehicle occupant moves his/her finger on the sheet switch 100 toward the right (in the direction of arrow Rh in FIG. 16), the moving direction of the finger, whose reference is the controller 70, is inclined by the angle −θ with respect to the moving direction of the finger, whose reference is the vehicle occupant. Therefore, even if the vehicle occupant intends to move his/her finger to the right, the finger will move upwardly at a right incline on the sheet switch 100.

Here, in step 464, a type of coordinate conversion is carried out on the basis of the continuous touch signal X1 and the rotational position detection signal R corresponding to the rotational angle θ. In this way, the continuous touch signal X1, whose reference is the controller 70, is converted into the corrected touch signal X3, whose reference is the vehicle occupant.

When the corrected touch signal X3 is generated in step 464 in this way, in step 458, moving processing of the map data is carried out on the basis of the corrected touch signal X3.

In this way, in the present embodiment, even if a finger is moved on the sheet switch 100 in the state in which the controller 70 has rotated accompanying the rotation of the steering wheel 22, the map data can be moved with the vehicle occupant being the reference. Therefore, it is possible to prevent the map data from being moved in an incorrect direction which does not match the sensation of operation, i.e., it is possible to prevent erroneous operation.

Note that the present embodiment is structured so as to merely correct the continuous touch signal X1. However, a structure is possible in which, for example, on the basis of a car speed signal from a car speed sensor which detects the traveling speed of the car, the continuous touch signal X1 is substantially nullified while the car is traveling, and the continuous touch signal X3 is corrected to a corrected touch signal X4 while the car is stopped.

INDUSTRIAL APPLICABILITY

The present invention can be applied to control systems for various devices such as a car navigation device, an audio device, an air conditioning device and the like, provided that the device is a car-mounted device of a type which is mounted to a steering wheel of a car and which is operated at a controller which has an operation surface such as a sheet switch or the like.

The invention claimed is:

1. A car-mounted device control system for controlling a predetermined car-mounted device which is mounted in a car, comprising:

operating means provided integrally with a steering wheel which steers a car by rotation-operation around a predetermined axis, the operating means having an operation surface whose surface is a flat surface or a curved surface, and detecting at least a position of an object to be detected on the operation surface, and outputting at least an operation signal corresponding to the position of the object to be detected on the operation surface;

rotation detecting means for detecting rotation of the steering wheel;

control means for controlling the car-mounted device on the basis of the operation signal, and nullifying the operation signal on the basis of a rotation detection signal from the rotation detecting means, wherein the rotation detecting means includes rotational speed detecting means for detecting a rotational speed of the steering wheel, and outputting a rotational speed detection signal, which corresponds to the rotational speed, to the control means as the rotation detection signal, and the control means nullifies the operation signal on the basis of the rotational speed detection signal in a case in which the rotational speed is a predetermined magnitude or greater.

2. The car-mounted device control system of claim 1, wherein the operating means includes:

position detecting means for detecting a position, on the operation surface, of the object to be detected which touches the operation surface; and pressure detecting means for detecting that pressing force of a predetermined magnitude or greater is imparted to the operation surface, and the operation signal includes:
a first operation signal outputted from the position detecting means and corresponding to the position of the object to be detected on the operation surface; and
a second operation signal outputted from the pressure detecting means in a case in which the pressure imparted to the operation surface is a predetermined magnitude,
and the control means nullifies the first operation signal and/or the second operation signal due to the rotation detection signal being inputted.

3. The car-mounted device control system of claim 2, wherein the rotation detecting means includes rotational position detecting means for detecting a rotational position of the steering wheel, and outputting a rotational position detection signal, which corresponds to the rotational position, to the control means as the rotation detection signal,
and the control means nullifies the first operation signal and/or the second operation signal on the basis of the rotational position detection signal when the steering wheel reaches a predetermined rotational position or when the steering wheel goes beyond the predetermined rotational position.

4. The car-mounted device control system of claim 3, comprising timer means for counting elapsed time from a time when one signal of the rotation detection signal and the operation signal is inputted to the control means,
wherein the control means nullifies the operation signal in a case in which, before or after a count value at the timer means reaches a predetermined value, another signal of the rotation detection signal and the operation signal is inputted.

5. The car-mounted device control system of claim 2, wherein the control means nullifies the first operation signal and/or the second operation signal on the basis of the rotational speed detection signal in a case in which the rotational speed is a predetermined magnitude or greater.

6. The car-mounted device control system of claim 5, comprising timer means for counting elapsed time from a time when one signal of the rotation detection signal and the operation signal is inputted to the control means,
wherein the control means nullifies the operation signal in a case in which, before or after a count value at the timer means reaches a predetermined value, another signal of the rotation detection signal and the operation signal is inputted.

7. The car-mounted device control system of claim 2, comprising timer means for counting elapsed time from a time when one signal of the rotation detection signal and the operation signal is inputted to the control means,
wherein the control means nullifies the operation signal in a case in which, before or after a count value at the timer means reaches a predetermined value, another signal of the rotation detection signal and the operation signal is inputted.

8. The car-mounted device control system of claim 3, wherein the control means nullifies the first operation signal and/or the second operation signal on the basis of the rotational speed detection signal in a case in which the rotational speed is a predetermined magnitude or greater.

9. The car-mounted device control system of claim 8, comprising timer means for counting elapsed time from a time when one signal of the rotation detection signal and the operation signal is inputted to the control means,
wherein the control means nullifies the operation signal in a case in which, before or after a count value at the timer means reaches a predetermined value, another signal of the rotation detection signal and the operation signal is inputted.

10. The car-mounted device control system of claim 1, wherein the rotation detecting means includes rotational position detecting means for detecting a rotational position of the steering wheel, and outputting a rotational position detection signal, which corresponds to the rotational position, to the control means as the rotation detection signal,
and the control means nullifies the operation signal on the basis of the rotational position detection signal when the steering wheel reaches a predetermined rotational position or when the steering wheel goes beyond the predetermined rotational position.

11. The car-mounted device control system of claim 10, comprising timer means for counting elapsed time from a time when one signal of the rotation detection signal and the operation signal is inputted to the control means,
wherein the control means nullifies the operation signal in a case in which, before or after a count value at the timer means reaches a predetermined value, another signal of the rotation detection signal and the operation signal is inputted.

12. The car-mounted device control system of claim 1, comprising timer means for counting elapsed time from a time when one signal of the rotation detection signal and the operation signal is inputted to the control means,
wherein the control means nullifies the operation signal in a case in which, before or after a count value at the timer means reaches a predetermined value, another signal of the rotation detection signal and the operation signal is inputted.

13. A car mounted device control system for controlling a predetermined car-mounted device which is mounted in a car, comprising:
operating means provided integrally with a steering wheel which steers a car by rotation-operation around a predetermined axis, the operating means having an operation surface whose surface is a flat surface or a curved surface, and detecting at least a position of an object to be detected on the operation surface, and outputting at least an operation signal corresponding to the position of the object to be detected on the operation surface;
rotation detecting means for detecting rotation of the steering wheel;
control means for controlling the car-mounted device on the basis of the operation signal, and nullifying the operation signal on the basis of a rotation detection signal from the rotation detecting means.
timer means for counting elapsed time from a time when one signal of the rotation detection signal and the operation signal is inputted to the control means,
wherein the control means nullifies the operation signal in a case in which, before or after a count value at the timer means reaches a predetermined value, another signal of the rotation detection signal and the operation signal is inputted.

14. A car-mounted device control system for controlling a predetermined car-mounted device which is mounted in a car, comprising:
operating means provided integrally with a steering wheel which steers a car by rotation-operation around a predetermined axis, the operating means having an operation surface whose surface is a flat surface or a curved surface, and detecting at least a position of an object to be detected on the operation surface, and outputting at least an operation signal corresponding to the position of the object to be detected on the operation surface on the basis of a continuous touch signal;

rotational position detecting means for detecting a rotational position of the steering wheel;

a car speed sensor for detecting the traveling a speed the car, and control means for controlling the car-mounted device on the basis of the operation signal, and correcting the operation signal, on the basis of the rotational position detection signal, in accordance with a rotational position of the operating means and for nullifying said continuous touch signal when said car speed sensor detects that the car is traveling.

15. The car mounted control system of claim 14, wherein the continuous touch signal is corrected to a corrected touch signal when said car speed sensor detects that the car has stopped.

16. A car-mounted device control system for controlling a predetermined car-mounted device wich is mounted in a car, comprising:

operating means provided integrally with a steering wheel which steers a car by rotation-operation around a predetermined axis, the operating means having an operation surface whose surface is a flat surface or a curved surface, and detecting at least a position of an object to be detected on the operation surface, and outputting at least an operation signal corresponding to the position of the object to be detected on the operation surface;

rotational position detecting means for detecting a rotational position of the steering wheel;

a car speed sensor for detecting the traveling speed of the car, and control means for controlling the car-mounted device on the basis of the operation signal, and correcting the operation signal on the basis of the rotational position detection signal, in accordance with a rotational position of the operating means, and on the basis of the detected result detected by the car speed sensor whether the car is traveling or not.

* * * * *